US 11,365,699 B2

(12) United States Patent
Suzuki et al.

(10) Patent No.: US 11,365,699 B2
(45) Date of Patent: Jun. 21, 2022

(54) INTERNAL COMBUSTION ENGINE CONTROL DEVICE

(71) Applicant: Hitachi Automotive Systems, Ltd., Hitachinaka (JP)

(72) Inventors: Kunihiko Suzuki, Hitachinaka (JP); Yoshihiko Akagi, Hitachinaka (JP); Shinya Matohara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/257,782

(22) PCT Filed: Sep. 6, 2019

(86) PCT No.: PCT/JP2019/035137
§ 371 (c)(1),
(2) Date: Jan. 4, 2021

(87) PCT Pub. No.: WO2020/066548
PCT Pub. Date: Apr. 2, 2020

(65) Prior Publication Data
US 2021/0270202 A1    Sep. 2, 2021

(30) Foreign Application Priority Data
Sep. 26, 2018    (JP) .............................. JP2018-180377

(51) Int. Cl.
*F02D 41/22*        (2006.01)
*F02D 41/00*        (2006.01)
(Continued)

(52) U.S. Cl.
CPC ....... *F02D 41/222* (2013.01); *F02D 41/0002* (2013.01); *F02D 41/18* (2013.01);
(Continued)

(58) Field of Classification Search
CPC .. F02D 41/0002; F02D 41/1405; F02D 41/18; F02D 41/182; F02D 41/187;
(Continued)

(56) References Cited

U.S. PATENT DOCUMENTS 4,773,375 A * 9/1988 Okino .................... F02D 41/04
                                                           123/488
5,186,045 A * 2/1993 Matsuoka ............. F02D 41/187
                                                           73/114.34
(Continued)

FOREIGN PATENT DOCUMENTS

DE    102005007057 A1 *  8/2006  ............. F02D 41/18
EP        2927465 A1 * 10/2015  ............... G01F 1/76
(Continued)

OTHER PUBLICATIONS

International Search Report with English translation and Written Opinion issued in corresponding application No. PCT/JP2019/035137 dated Dec. 24, 2019.

*Primary Examiner* — John M Zaleskas
(74) *Attorney, Agent, or Firm* — Foley & Lardner LLP

(57) ABSTRACT

Provided is an internal combustion engine control device capable of more appropriately correcting an output value of a flow rate sensor that measures a flow rate of air flowing through an intake flow path of an internal combustion engine, and further reducing an error between a corrected air flow rate and an actual air flow rate as compared to a conventional device. For this purpose, the internal combustion engine control device of the present invention includes an arithmetic device 100 including a fundamental frequency derivation unit 104 that derives a fundamental frequency, a flow rate amplitude calculation unit 107 that extracts a radio frequency of a plurality of frequencies equal to or higher than the fundamental frequency from a pulsation waveform based on the output value of the flow rate sensor as a flow (Continued)

rate radio frequency and calculates an amplitude of the flow rate radio frequency for each frequency, a correction amount derivation unit 108 that derives a correction amount based on the amplitude of the flow rate radio frequency for each frequency, and a flow rate calculation unit 109 that calculates a flow rate of air by using the output value of the flow rate sensor and the correction amount.

7 Claims, 21 Drawing Sheets

(51) Int. Cl.
| | |
|---|---|
| *G01F 1/69* | (2006.01) |
| *G01F 5/00* | (2006.01) |
| *G01L 13/00* | (2006.01) |
| *F02D 41/18* | (2006.01) |
| *G01F 1/696* | (2006.01) |
| *F02D 41/28* | (2006.01) |
| *G01F 15/04* | (2006.01) |
| *G01F 1/72* | (2006.01) |

(52) U.S. Cl.
CPC .............. *G01F 1/69* (2013.01); *G01F 1/6965* (2013.01); *G01F 5/00* (2013.01); *G01L 13/00* (2013.01); *F02D 2041/288* (2013.01); *F02D 2200/0402* (2013.01); *F02D 2200/0406* (2013.01); *G01F 1/72* (2013.01); *G01F 15/04* (2013.01)

(58) Field of Classification Search
CPC .............. F02D 41/222; F02D 2041/288; F02D 2200/0402; F02D 2200/0406; G01F 1/69; G01F 1/6965; G01F 1/72; G01F 15/04; G01F 5/00
See application file for complete search history.

(56) References Cited

U.S. PATENT DOCUMENTS

| | | | | |
|---|---|---|---|---|
| 5,241,857 A | * | 9/1993 | Schnaibel | F02D 41/187 |
| | | | | 73/114.34 |
| 6,131,444 A | * | 10/2000 | Wu | F02D 41/1405 |
| | | | | 73/114.02 |
| 2002/0045982 A1 | * | 4/2002 | Aono | F02D 41/187 |
| | | | | 701/102 |
| 2002/0166539 A1 | * | 11/2002 | Gaessler | F02D 13/0207 |
| | | | | 123/404 |
| 2004/0103880 A1 | * | 6/2004 | Hirayama | G01F 15/046 |
| | | | | 123/350 |
| 2004/0204871 A1 | * | 10/2004 | Frie | F02D 41/187 |
| | | | | 702/56 |
| 2004/0230368 A1 | * | 11/2004 | Kropinski | G05B 23/024 |
| | | | | 701/114 |
| 2005/0065707 A1 | * | 3/2005 | Kaga | F02D 41/182 |
| | | | | 701/103 |
| 2005/0080550 A1 | | 4/2005 | Nakamura | |
| 2005/0234630 A1 | * | 10/2005 | Nakazawa | F02D 41/18 |
| | | | | 701/102 |
| 2006/0224298 A1 | * | 10/2006 | Lang | G01F 1/72 |
| | | | | 701/114 |
| 2008/0092645 A1 | * | 4/2008 | Kanke | G01F 1/6845 |
| | | | | 73/204.14 |
| 2011/0023852 A1 | * | 2/2011 | Yamashita | F01M 13/00 |
| | | | | 123/574 |
| 2011/0137509 A1 | * | 6/2011 | Sarac | F02D 13/02 |
| | | | | 701/31.4 |
| 2013/0166180 A1 | * | 6/2013 | Yoshikawa | F02D 41/182 |
| | | | | 701/104 |
| 2013/0197782 A1 | * | 8/2013 | Genko | F02D 41/0085 |
| | | | | 701/103 |
| 2017/0016409 A1 | * | 1/2017 | Ito | F02D 41/222 |
| 2017/0198649 A1 | * | 7/2017 | Kainz | F02D 41/009 |
| 2018/0299309 A1 | * | 10/2018 | Matsumoto | G01F 1/662 |
| 2019/0390625 A1 | * | 12/2019 | Nitta | G01F 9/00 |
| 2020/0018253 A1 | * | 1/2020 | Yamada | F02D 13/0234 |
| 2020/0040829 A1 | * | 2/2020 | Braun | F02D 41/009 |
| 2020/0040834 A1 | * | 2/2020 | Ito | F02D 41/18 |
| 2020/0200113 A1 | * | 6/2020 | Braun | F02D 41/1448 |
| 2020/0200583 A1 | * | 6/2020 | Matsumoto | G01F 5/005 |
| 2020/0264023 A1 | * | 8/2020 | Kitahara | G01F 1/696 |
| 2020/0300185 A1 | * | 9/2020 | Braun | F02D 41/009 |
| 2021/0054798 A1 | * | 2/2021 | Ito | G01F 1/696 |

FOREIGN PATENT DOCUMENTS

| | | | | |
|---|---|---|---|---|
| JP | 05264313 A | * | 10/1993 | |
| JP | H05-264313 A | | 10/1993 | |
| JP | 2004-234260 A | | 8/2004 | |
| JP | 2005-121439 A | | 5/2005 | |
| JP | 2009-281284 A | | 12/2009 | |
| JP | 2010101261 A | * | 5/2010 | |
| JP | 2012-112716 A | | 6/2012 | |
| JP | 2012112716 A | * | 6/2012 | .............. G01F 1/76 |
| JP | 2013-108402 A | | 6/2013 | |
| JP | 2013160121 A | * | 8/2013 | .............. F02D 41/18 |
| JP | 2014-020212 A | | 2/2014 | |

* cited by examiner $$\frac{dU}{dt} = -\frac{1}{2}U|U|\frac{C_p}{L} - \frac{1}{2}U|U|\frac{C_f}{D} \quad : \text{MAIN FLOW}$$

$$\frac{du}{dt} = -\frac{1}{2}u|u|\frac{c_p}{l} - \frac{1}{2}u|u|\frac{c_f}{d} \quad : \text{BYPASS FLOW}$$

SUPERVISED LEARNING (BACKPROPAGATION)

PULSATION CORRECTION AMOUNT CALCULATION

INTERNAL COMBUSTION ENGINE CONTROL DEVICE

TECHNICAL FIELD

The present disclosure relates to an internal combustion engine control device.

BACKGROUND ART

Conventionally, an invention relating to a control device for an internal combustion engine provided with an air flow sensor has been known (see PTL 1 below). This conventional control device includes an intake air amount calculation means, a pulsation amplitude ratio calculation means, a pulsation frequency calculation means, and a pulsation error calculation means (see claim 1 and the like of the same document).

The intake air amount calculation means calculates an intake air amount based on an output value of the air flow sensor. The pulsation amplitude ratio calculation means calculates a pulsation amplitude ratio from a pulsation amplitude amount and an average air amount of the intake air amount. The pulsation frequency calculation means calculates a pulsation frequency caused by the number of revolutions of the engine. The pulsation error calculation means calculates a pulsation error by using the pulsation amplitude ratio calculation means and the pulsation frequency calculation means. This conventional control device is characterized in that the intake air amount is corrected based on a pulsation error correction amount calculated by the pulsation error calculation means.

That is, this conventional control device first obtains a pulsation frequency from an engine speed. Next, a frequency response correction amount for correcting a frequency response of a hot wire air flow sensor is obtained from this pulsation frequency. Next, a pulsation amplitude ratio is obtained from this frequency response correction amount and an air flow sensor output value. Then, the air flow sensor output value is corrected so as to obtain a final air amount by a pulsation error correction map composed of the pulsation frequency and the pulsation amplitude ratio (see Paragraph 0012 and the like of the same document).

According to this conventional control device for an internal combustion engine, an air amount can be obtained in consideration of the influence of an intake air pulsation over a wide rotation range, and an intake air amount can be accurately calculated regardless of the magnitude of an intake air pulsation and a frequency change. Accordingly, the pulsation error can be reduced (see Paragraph 0013 and the like of the same document).

CITATION LIST

Patent Literature

PTL 1: JP 2014-020212 A

SUMMARY OF INVENTION

Technical Problem

As described above, the conventional control device for an internal combustion engine corrects the air flow sensor output value based on the pulsation frequency and the pulsation amplitude ratio. However, the inventors of the present application have found that, depending on an operation condition of an internal combustion engine, an error may occur between a corrected air flow rate and an actual air flow rate only by the correction based on the pulsation frequency and the pulsation amplitude ratio.

The present disclosure provides an internal combustion engine control device capable of further reducing an error between a corrected air flow rate and an actual air flow rate as compared to the conventional device by more appropriately correcting an output value of a flow rate sensor that measures a flow rate of air flowing through an intake flow path of an internal combustion engine.

Solution to Problem

One aspect of the present disclosure is an internal combustion engine control device including an arithmetic device to which an output value of a flow rate sensor that measures a flow rate of air flowing through an intake flow path is input. The arithmetic device includes: a fundamental frequency derivation unit that derives a fundamental frequency that is a frequency of a pulsation waveform of the flow rate according to a rotational speed of the internal combustion engine; a flow rate amplitude calculation unit that extracts a radio frequency of a plurality of frequencies equal to or higher than the fundamental frequency from a pulsation waveform based on an output value of the flow rate sensor as a flow rate radio frequency, and calculates an amplitude of the flow rate radio frequency for each frequency; a correction amount derivation unit that derives a correction amount based on an amplitude of the flow rate radio frequency for each frequency; and a flow rate calculation unit that calculates a flow rate of the air using an output value of the flow rate sensor and the correction amount.

Advantageous Effects of Invention

According to one aspect of the present disclosure, an internal combustion engine control device capable of further reducing an error between a corrected air flow rate and an actual air flow rate as compared to the conventional device by more appropriately correcting an output value of a flow rate sensor that measures a flow rate of air flowing through an intake flow path of an internal combustion engine can be provided.

DESCRIPTION OF EMBODIMENTS

Hereinafter, embodiments of the internal combustion engine control device of the present disclosure will be described with reference to the drawings.

First Embodiment

Figure 1:
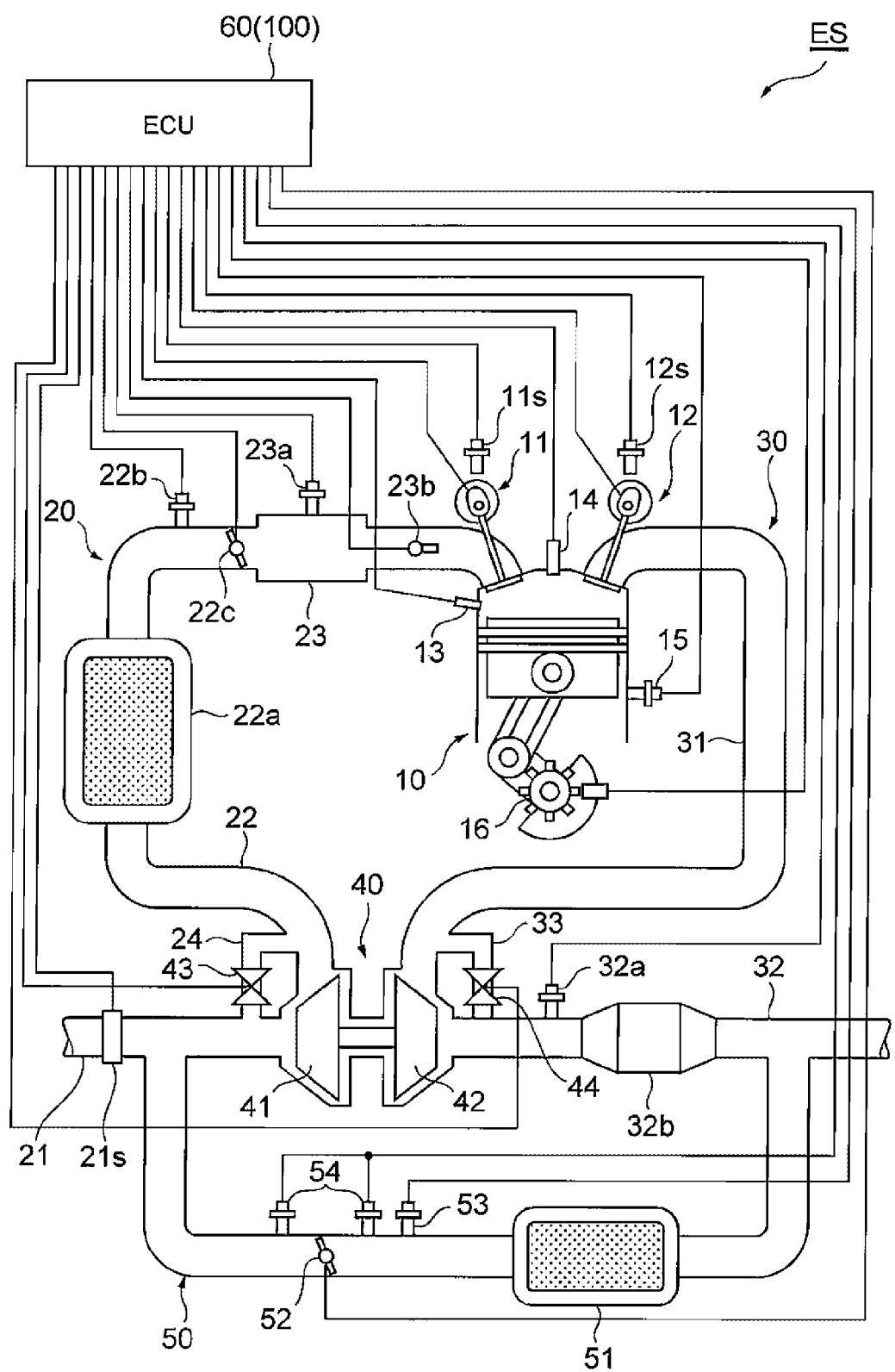
FIG. 1 is a schematic configuration diagram of an engine system including an internal combustion engine control device according to a first embodiment of the present disclosure.
Figure 2:
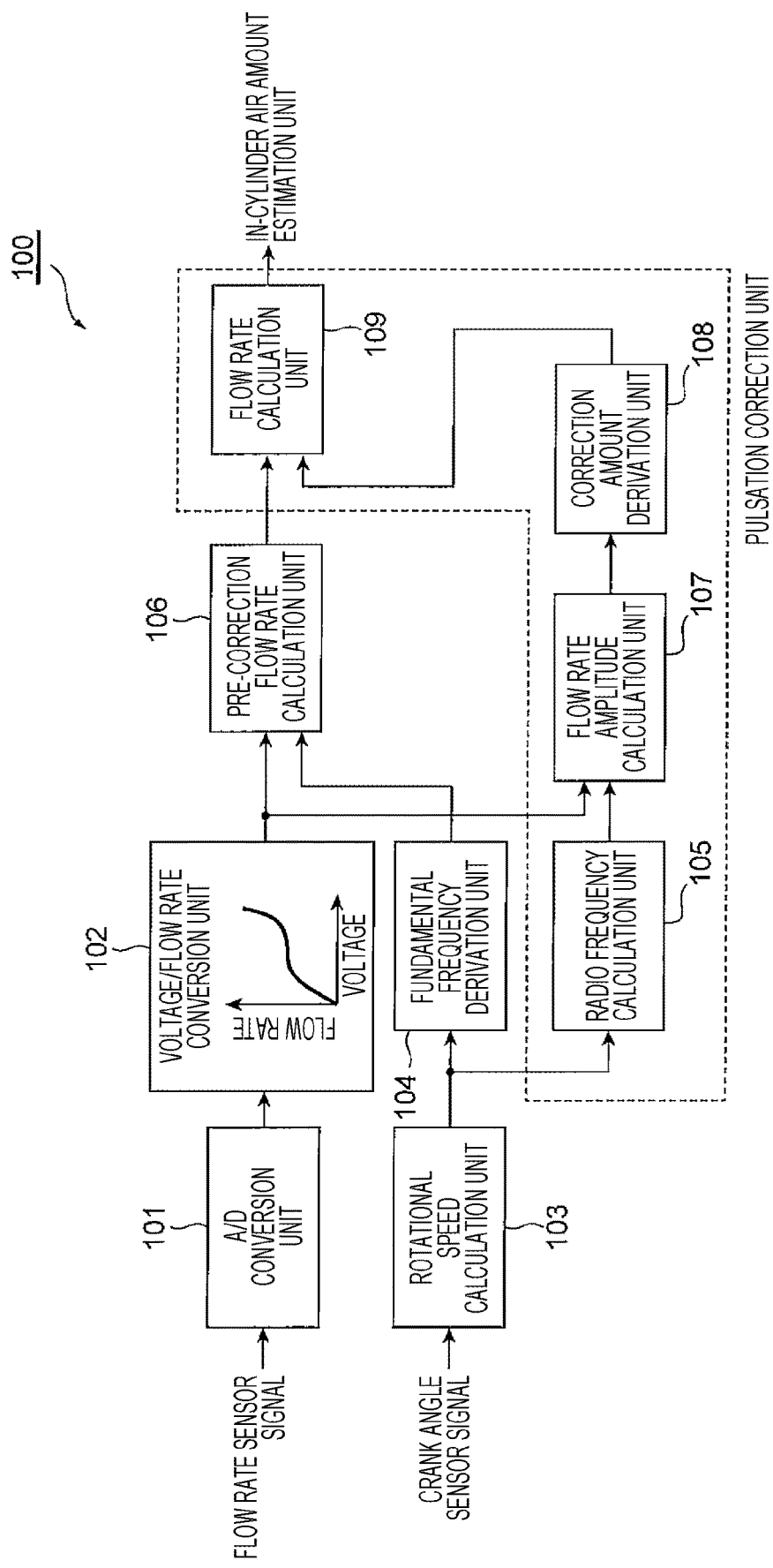
FIG. 2 is a block diagram of an arithmetic device included in the internal combustion engine control device according to the first embodiment of the present disclosure.

FIG. 1 is a schematic configuration diagram of an engine system ES including an internal combustion engine control device 60 according to a first embodiment of the present disclosure. FIG. 2 is a block diagram of an arithmetic device 100 included in the internal combustion engine control device 60 according to the first embodiment of the present disclosure.

The engine system ES includes, for example, an internal combustion engine 10, an intake flow path 20, an exhaust flow path 30, a turbo supercharger 40, an exhaust gas recirculation (EGR) flow path 50, and the internal combustion engine control device 60. The internal combustion engine control device 60 of the present embodiment is, for example, an electronic control unit (ECU) including the arithmetic device 100 which is a central processing unit (CPU) and a storage device (ROM, RAM, and the like).

Although the details will be described later, the internal combustion engine control device 60 of the present embodiment is a control device including the arithmetic device 100 to which an output value of a flow rate sensor 21s for measuring a flow rate of air flowing through the intake flow path 20 is input, and is characterized by a configuration described below. The arithmetic device 100 includes a fundamental frequency derivation unit 104, a flow rate amplitude calculation unit 107, a correction amount derivation unit 108, and a flow rate calculation unit 109. The fundamental frequency derivation unit 104 derives the fundamental frequency, which is a frequency of a pulsation waveform of an air flow rate according to a rotational speed of the internal combustion engine 10. The flow rate amplitude calculation unit 107 extracts a radio frequency of a plurality of frequencies equal to or higher than the fundamental frequency from the pulsation waveform based on the output value of the flow rate sensor 21s as a flow rate radio frequency, and calculates an amplitude of the flow rate radio frequency for each frequency. The correction amount derivation unit 108 derives a correction amount based on the amplitude of the flow rate radio frequency for each frequency. The flow rate calculation unit 109 calculates a flow rate of air flowing through the intake flow path 20 using the output value of the flow rate sensor 21s and the correction amount.

Hereinafter, the configuration of each part of the engine system ES will be described first, and then the control of the internal combustion engine 10 by the internal combustion engine control device 60 will be described.

The internal combustion engine 10 includes, for example, an intake valve 11, an exhaust valve 12, a fuel injection valve 13, a spark plug 14, a knock sensor 15, and a crank angle sensor 16.

The internal combustion engine 10 is connected to the intake flow path 20 and the exhaust flow path 30. Each of the intake valve 11 and the exhaust valve 12 has a variable valve mechanism. The variable valve mechanism includes sensors 11s and 12s that detect the open/closed phases of the intake valve 11 and the exhaust valve 12, and has a configuration of making the phases of the intake valve 11 and the exhaust valve 12 continuously variable.

The fuel injection valve 13 is, for example, a direct injection valve that injects fuel directly into a cylinder of the internal combustion engine 10. Note that the fuel injection valve 13 may be an injection valve of a port injection type that injects fuel into an intake port. The spark plug 14 has an electrode part exposed in the cylinder of the internal combustion engine 10, and ignites combustible mixture with a spark. The knock sensor 15 is provided in a cylinder block of the internal combustion engine 10 and detects the presence or absence of a knock generated in a combustion chamber. The crank angle sensor 16 is provided on a crankshaft of the internal combustion engine 10, and outputs, for each combustion cycle, a signal corresponding to a rotation angle of the crankshaft to the ECU 60 as a signal indicating a rotational speed of the crankshaft.

The intake flow path 20 has, for example, an upstream portion 21, a middle flow portion 22, a downstream portion 23, and a bypass portion 24. The upstream portion 21 is a flow path connecting an air cleaner (not shown) and the turbo supercharger 40. The middle flow portion 22 is a flow path connecting the turbo supercharger 40 and the downstream portion 23 of the intake flow path 20. The downstream portion 23 is an intake manifold connected to the internal combustion engine 10. The bypass portion 24 is a flow path connecting the upstream portion 21 and the middle flow portion 22.

The upstream portion 21 of the intake flow path 20 is provided with, for example, the flow rate sensor 21s for measuring a flow rate of air flowing through the intake flow path 20. The flow rate sensor 21s is, for example, an air flow sensor including an intake air temperature sensor.

Figure 3:
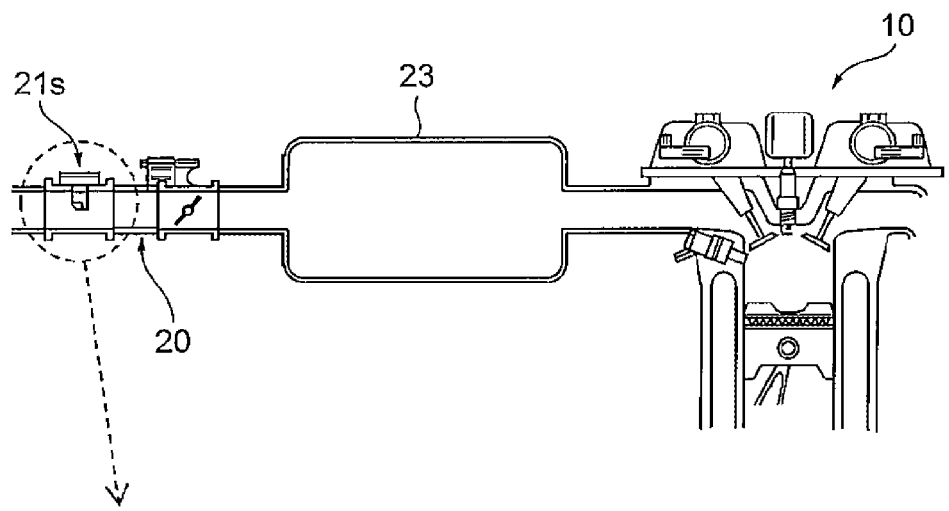
FIG. 3 is an explanatory diagram of a flow rate sensor included in the engine system shown in FIG. 1.
Figure 3:
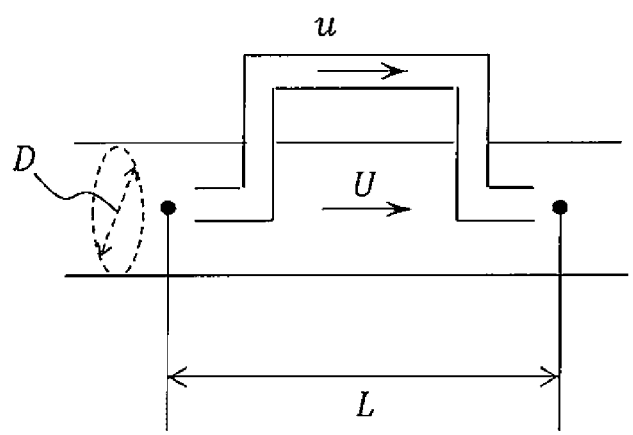

FIG. 3 is an explanatory diagram explaining an example of the measurement principle of the flow rate sensor 21s. The flow rate sensor 21s is, for example, a hot wire air flow sensor. The flow rate sensor 21s includes, for example, a bypass passage which is a sub-passage for bypassing air flowing through the intake flow path 20 which is the main passage. The flow rate sensor 21s is provided with a sensor element for detecting a flow velocity of air in the bypass passage. In the flow rate sensor 21s, dust and water can be prevented from adhering to the sensor element by devising the shape of the bypass flow path.

As shown in FIG. 3, the shape of a flow field is different between the main passage through which a main flow flows and the bypass passage through which a bypass flow flows. More specifically, for example, a length L and an inner diameter D of the flow field of the main flow are different from a length l and an inner diameter d of the flow field of the bypass flow. For this reason, a shape loss coefficient Cp and a friction loss coefficient Cf of the flow field of the main flow are different from a shape loss coefficient cp and a friction loss coefficient cf of the flow field of the bypass flow. Therefore, as shown in FIG. 3, the flow field of the main flow and the flow field of the bypass flow are flow fields based on different momentum equations.

The hot wire air flow sensor has a heat generating resistor disposed in an air flow to be measured as a main constituent, and a bridge circuit is configured so that a value of current flowing through the heat generating resistor increases when an intake air amount is large, and conversely, decreases when the intake air amount is small. That is, the flow rate sensor 21s is configured to take out an air amount as a voltage signal based on, for example, the current flowing through the heat generating resistor. The flow rate sensor 21s outputs a voltage signal corresponding to a flow rate of air flowing through the bypass flow path by detecting a heat radiation amount caused by a local flow near a sensor element of air flowing through the bypass passage.

The middle flow portion 22 of the intake flow path 20 is provided with, for example, an intercooler 22a, a supercharging temperature sensor 22b, and a throttle valve 22c. The intercooler 22a cools air whose temperature is increased due to adiabatic compression by a compressor 41 of the turbo supercharger 40 to lower the temperature. The supercharging temperature sensor 22b is disposed downstream of the intercooler 22a and measures a temperature of the air cooled by the intercooler 22a. The temperature of the air measured by the supercharging temperature sensor 22b is referred to as a "supercharging temperature". The throttle valve 22c is provided downstream of the supercharging temperature sensor 22b, narrows the intake flow path 20, and controls an amount of air flowing into the cylinder of the internal combustion engine 10. The throttle valve 22c is composed of, for example, an electronically controlled butterfly valve for which the valve opening degree can be controlled independently of a depression amount of an accelerator pedal by a driver.

For example, a supercharging pressure sensor 23a and a flow strengthening valve 23b are provided in the downstream portion 23 of the intake flow path 20. The supercharging pressure sensor 23a is disposed on the downstream side of the throttle valve 22c provided in the middle flow portion 22. Note that the downstream portion 23 of the intake flow path 20 which is the intake manifold connected to the internal combustion engine 10 and the intercooler 22a may be configured to be integrated.

In this case, since the volume from the downstream side of the compressor 41 of the turbo supercharger 40 to the cylinder of the internal combustion engine 10 can be reduced, the responsiveness of acceleration and deceleration can be improved. The flow strengthening valve 23b increases the turbulence generated in the internal flow of the cylinder of the internal combustion engine 10 by generating a drift in the intake air.

The exhaust flow path 30 has, for example, an upstream portion 31, a downstream portion 32, and a bypass portion 33. The upstream portion 31 is an exhaust manifold that connects the internal combustion engine 10 and the turbo supercharger 40. The downstream portion 32 is a flow path connecting the turbo supercharger 40 and a muffler (not shown). The bypass portion 33 is a flow path connecting the upstream portion 31 and the downstream portion 32 of the exhaust flow path 30. For example, an air-fuel ratio sensor 32a and an exhaust gas purification catalyst 32b are provided in the downstream portion 32 of the exhaust flow path 30.

The air-fuel ratio sensor 32a is provided downstream of a turbine 42 of the turbo supercharger 40, and outputs a signal indicating the detected oxygen concentration, that is, the air-fuel ratio to the internal combustion engine control device 60. The exhaust gas purification catalyst 32b is provided downstream of the air-fuel ratio sensor 32a, and purifies harmful exhaust gas components such as carbon monoxide, nitrogen compounds, and unburned hydrocarbons in the exhaust gas by a catalytic reaction.

The turbo supercharger 40 is composed of the compressor 41 and the turbine 42, and includes, for example, an air bypass valve 43 provided in the bypass portion 24 of the intake flow path 20 and a waste gate valve 44 provided in the bypass portion 33 of the exhaust flow path 30. The compressor 41 has a compressor blade, and the upstream portion 21 of the intake flow path 20 is connected to the upstream side of the compressor blade, and the middle flow portion 22 of the intake flow path 20 is connected to the downstream side of the compressor blade.

The turbine 42 has a turbine blade connected to the compressor blade, and the upstream portion 31 of the exhaust flow path 30 is connected to the upstream side of the turbine blade, and the downstream portion 32 of the exhaust flow path 30 is connected to the downstream side of the turbine blade. The turbine 42 converts the energy of the exhaust gas flowing through the exhaust flow path 30 into rotational energy with the turbine blade. The compressor 41 compresses the air flowing through the intake flow path 20 by the rotation of the compressor blade.

The air bypass valve 43 prevents the pressure from the downstream side of the compressor 41 to an upstream portion of the throttle valve 22c from excessively increasing under the control of the internal combustion engine control device 60. In a case where the throttle valve 22c is suddenly closed in a supercharging state, the air bypass valve 43 is opened according to the control of the internal combustion engine control device 60, so that the compressed intake air downstream of the compressor 41 flows back to the upstream side of the compressor 41 by passing through the bypass portion 24 of the intake flow path 20. As a result, the supercharging pressure can be reduced.

The waste gate valve 44 is an electric valve whose valve opening degree can be freely controlled with respect to the supercharging pressure under the control of the internal combustion engine control device 60. The opening degree of the waste gate valve 44 is adjusted by the internal combustion engine control device 60 based on the supercharging pressure detected by the supercharging pressure sensor 23a provided in the downstream portion 23 of the intake flow path 20. With part of the exhaust gas passing through the bypass portion 33 of the exhaust flow path 30, the work that the exhaust gas provides to the turbine 42 can be reduced, and as a result, the supercharging pressure can be maintained at a target pressure.

The EGR flow path 50 has one end connected to the downstream portion 32 of the exhaust flow path 30 and the other end connected to the upstream portion 21 of the intake flow path 20, and causes exhaust gas to be divided and flow back from the downstream side of the exhaust gas purification catalyst 32b to the upstream side of the compressor 41. The EGR flow path 50 is provided with, for example, an EGR cooler 51, an EGR valve 52, a temperature sensor 53, and a differential pressure sensor 54. The EGR cooler 51 cools the exhaust gas. The EGR valve 52 is provided downstream of the EGR cooler 51 and controls the flow rate of the exhaust gas. The temperature sensor 53 detects the temperature of the exhaust gas in an upstream portion of the EGR valve 52. The differential pressure sensor 54 detects the differential pressure between the upstream side and the downstream side of the EGR valve 52.

The internal combustion engine control device 60 controls each part of the engine system and executes various types of data processing. The internal combustion engine control device 60 is connected to the various sensors described above and various actuators. The various actuators drive, for example, a throttle valve, the fuel injection valve 13, the intake valve 11 and the exhaust valve 12 with a variable valve mechanism, and an EGR valve. The internal combustion engine control device 60 controls the operation of such various actuators. Further, the internal combustion engine control device 60 detects an operation state of the internal combustion engine 10 based on signals input from various sensors, and ignites the spark plug 14 at a timing determined according to the operation state.

Next, a control example of the internal combustion engine 10 by the internal combustion engine control device 60 will be described.

Figure 4:
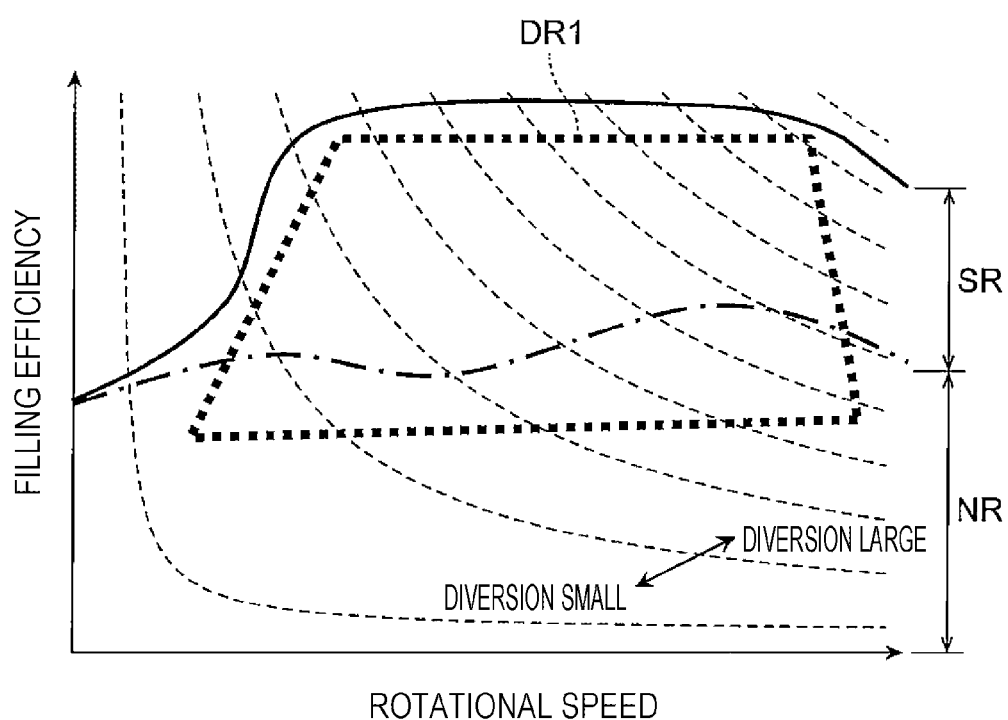
FIG. 4 is a graph explaining an operation region of an internal combustion engine in which EGR is introduced.

FIG. 4 is a graph explaining an operation region DR1 of the internal combustion engine 10 in which EGR is introduced. As shown in FIG. 4, the operation region DR1 of the internal combustion engine 10 is, for example, a region defined by the rotational speed and the filling efficiency of the internal combustion engine 10. The filling efficiency is a ratio of the mass of air sucked into the cylinder in one cycle to the mass of air in a standard state corresponding to the volume of the cylinder of the internal combustion engine 10.

The operation region DR1 of the internal combustion engine 10 is roughly divided into a non-supercharged region NR and a supercharged region SR. In the graph shown in FIG. 4, flow rates of the intake air are equal on each curve shown by a thin broken line.

Further, the curve in an upper portion of the graph has a larger flow rate, and the curve in a lower portion of the graph has a smaller flow rate.

The internal combustion engine control device 60 controls the filling efficiency by the throttle valve 22c in the non-supercharged region NR and opens the throttle valve 22c and controls the supercharging pressure by the waste gate valve 44 in the supercharged region SR, so as to control the filling efficiency. In this way, the means for adjusting the torque is switched between the non-supercharged region NR and the supercharged region SR, so that the pump loss generated in the internal combustion engine 10 can be reduced, and fuel-efficient operation can be realized.

As shown in FIG. 4, the internal combustion engine control device 60 causes EGR cooled by the EGR cooler 51 to flow back to the cylinder of the internal combustion engine 10 in the operation region DR1 from a relatively high load condition of the non-supercharged region NR of the internal combustion engine 10 to the supercharged region SR. In this manner, gas sucked into the cylinder of the internal combustion engine 10 can be diluted with EGR, which is inert gas, and improper combustion called knock, which tends to occur under a high load condition, can be suppressed. Since knock can be suppressed, appropriate spark advance control of an ignition timing can be performed, and fuel-efficient operation can be realized.

Figure 5:
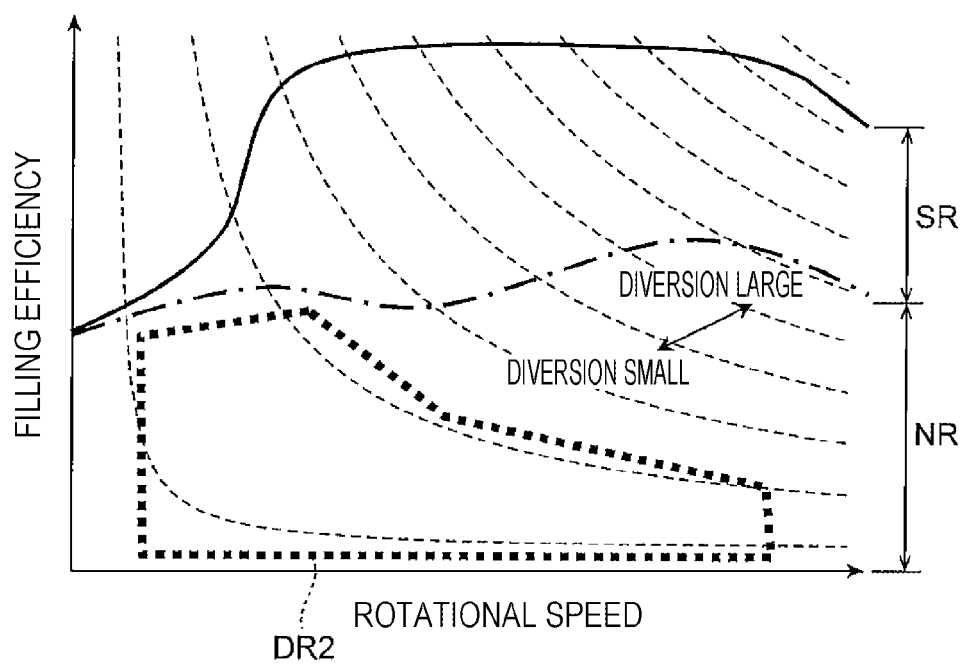
FIG. 5 is a graph explaining an operation region of an internal combustion engine that performs the Miller cycle.

FIG. 5 is a graph explaining an operation region DR2 of the internal combustion engine 10 that performs the Miller cycle. As shown in FIG. 5, the operation region DR2 of the internal combustion engine 10 is, for example, a region defined by the rotational speed and the filling efficiency of the internal combustion engine 10. In the operation region DR2 of a relatively low flow rate of the internal combustion engine 10, the throttle valve 22c is controlled closer to the closed side in order to reduce the amount of air sucked into the cylinder. This tends to increase pump loss.

As the internal combustion engine control device 60 shifts a closing time of the intake valve 11 from the bottom dead center to the earlier side or the later side, the work required for compression by the piston can be reduced and the Miller cycle can be realized. Further, if the internal combustion engine control device 60 controls the phase in which the intake valve 11 is opened and closed so that the intake air amount is controlled, the throttle valve 22c can be set closer to the open side, and the pump loss can be reduced. Due to the effect of the Miller cycle and the reduction effect of the pump loss, fuel-efficient operation can be realized.

Figure 6A:
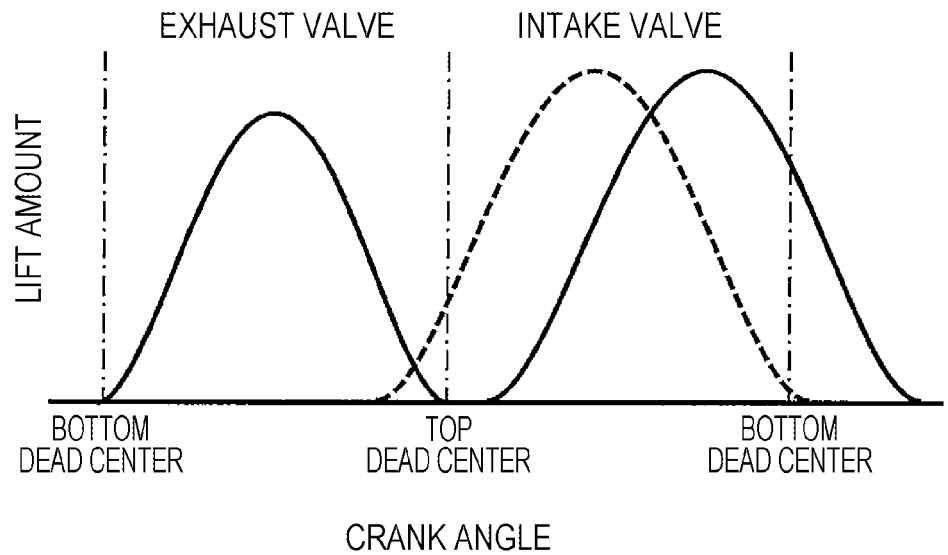
FIG. 6A is a lift pattern of an intake/exhaust valve that realizes a late closing Miller cycle.
Figure 6B:
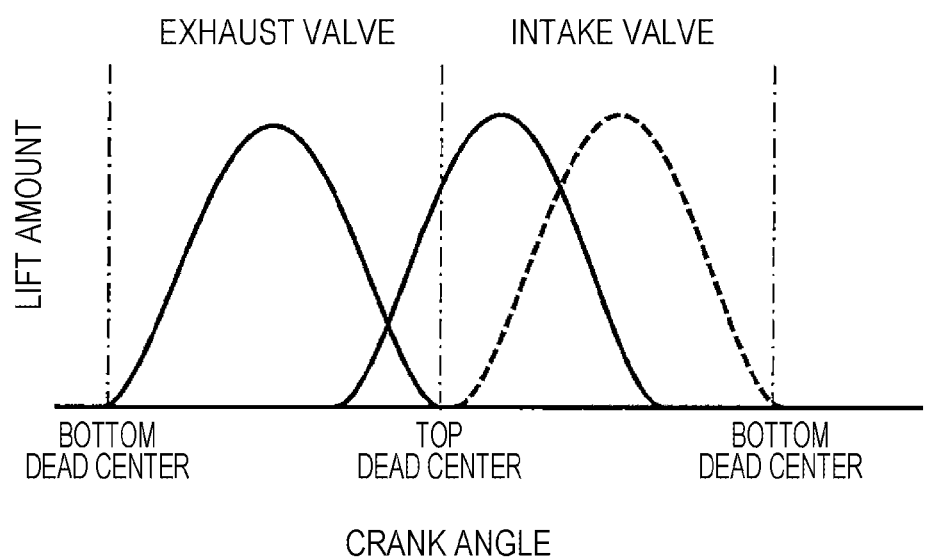
FIG. 6B is a lift pattern of an intake/exhaust valve that realizes an early closing Miller cycle.

FIG. 6A is a lift pattern of an intake valve and an exhaust valve that realize a late closing Miller cycle. FIG. 6B is a lift pattern of the intake valve and the exhaust valve that realize an early closing Miller cycle. As the internal combustion engine control device 60 makes the phase of the intake valve 11 variable, if the closing timing of the intake valve is set to the early side or the late side from the bottom dead center, the amount of air sucked into the cylinder increases or decreases.

In the late closing Miller cycle shown in FIG. 6A, the piston of the internal combustion engine 10 moves from the top dead center to the bottom dead center, and the intake valve 11 is closed while the piston further moves from the bottom dead center to the top dead center. In this manner, the gas once sucked into the cylinder of the internal combustion engine 10 is blown back to the intake flow path 20 after the piston at the bottom dead center, so that the amount of intake air into the cylinder is suppressed.

On the other hand, in the early closing Miller cycle shown in FIG. 6B, the piston of the internal combustion engine 10 moves from the top dead center to the bottom dead center, and the intake valve 11 is closed while air is being sucked into the cylinder, so that the amount of air sucked into the cylinder is suppressed. The engine system ES of the present embodiment has a configuration in which the phase variable mechanism of the intake valve 11 is employed to realize the Miller cycle. However, a lift switching mechanism and a phase/lift continuously variable mechanism of the intake valve 11 can also be employed to realize the Miller cycle.

Figure 7A:
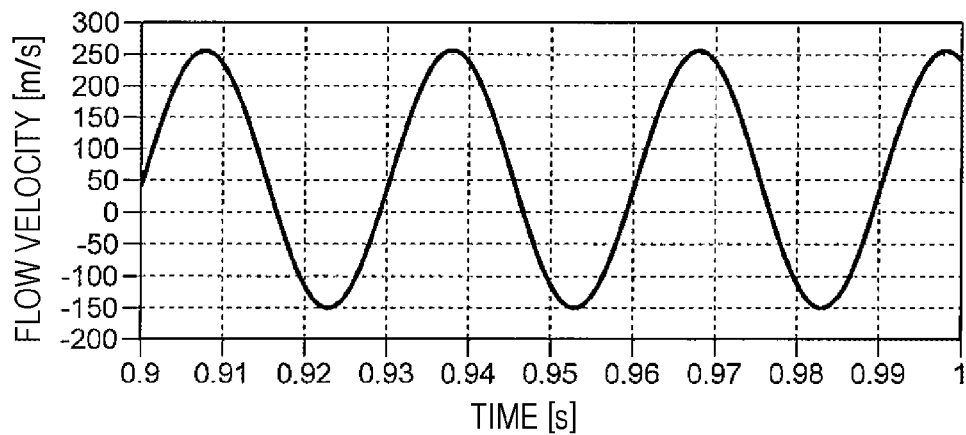
FIG. 7A is a graph showing a pulsation of air at a position of the flow rate sensor shown in FIG. 1.
Figure 7B:
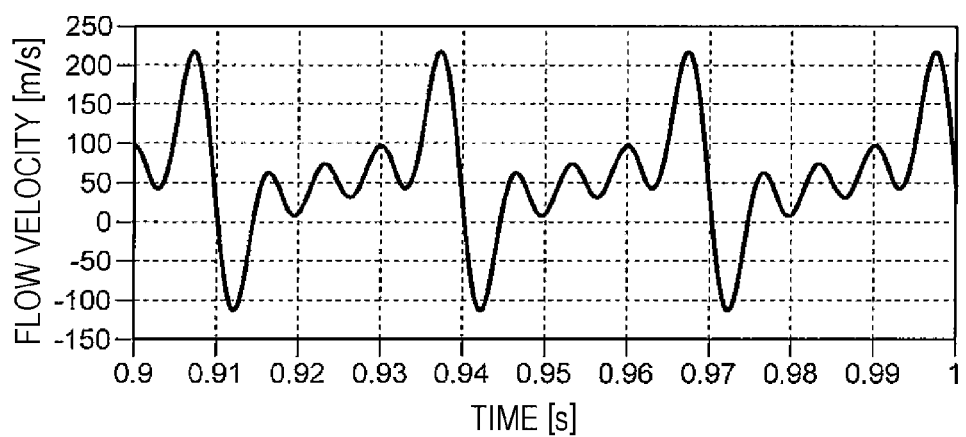
FIG. 7B is a graph showing a pulsation of air at a position of the flow rate sensor shown in FIG. 1.
Figure 7C:
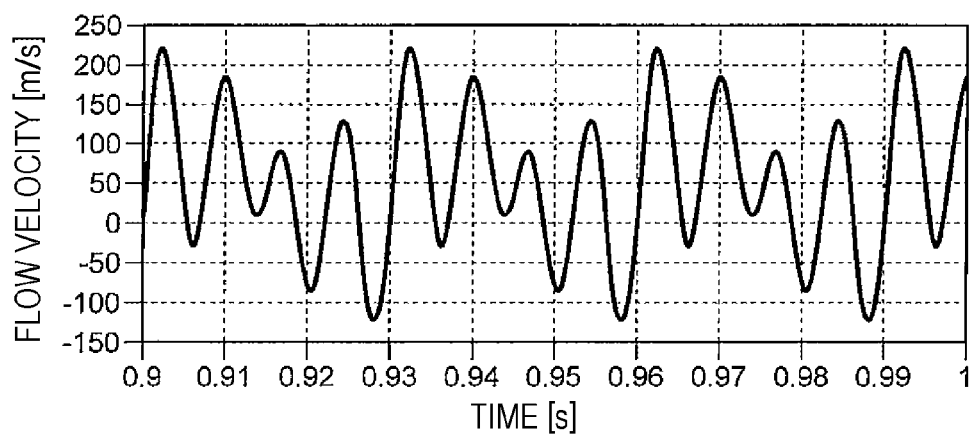
FIG. 7C is a graph showing a pulsation of air at a position of the flow rate sensor shown in FIG. 1.

FIGS. 7A, 7B, and 7C are graphs showing the pulsation of air at the position of the flow rate sensor 21s of the intake flow path 20 shown in FIG. 1. The internal combustion engine 10 performs intermittent intake by performing intake only in the intake stroke of each cylinder. In this manner, as shown in FIG. 7A, pulsation occurs in the air flowing through the intake flow path 20.

In the internal combustion engine 10, a pulsation with a large pulsation amplitude ratio tends to be generated at a low frequency in a low rotation and high load region. The pulsation amplitude ratio is obtained by dividing a pulsation amplitude amount, which is a difference between a maximum flow rate and a minimum flow rate during pulsation, by an average air amount at that time, and is an index showing how much the amplitude is with respect to the average air amount. Pulsation with a large pulsation amplitude ratio at a low frequency is a factor that deteriorates the detection accuracy of the flow rate sensor 21s. The internal combustion engine 10 has a large pulsation amplitude with respect to an average flow velocity under a low rotation and high load condition. Under such a low rotation and high load condition, there exists a timing at which a flow velocity direction indicates backflow.

FIG. 7B shows the pulsation of air when the late closing Miller cycle is performed in the internal combustion engine 10. As described above, in the late closing Miller cycle, the gas once sucked into the cylinder of the internal combustion engine 10 is blown back to the intake flow path 20. Further, the throttle valve 22c is set on the open side as compared to a normal cycle. Due to the influence of the above, there is a situation where the pulsation generated in the cylinder of the internal combustion engine 10 easily reaches the flow rate sensor 21s.

FIG. 7C shows the pulsation of air when EGR is introduced in the internal combustion engine 10.

The exhaust gas flowing through the exhaust flow path 30 generates a larger pulsation than that of the air flowing through the intake flow path 20. The pulsation of the exhaust gas flowing through the exhaust flow path 30 propagates to the air flowing through the intake flow path 20 through the EGR flow path 50. If the EGR valve 52 is set to the open side in order to cause more exhaust gas to flow back, the pulsation of air at the position of the flow rate sensor 21s tends to become large.

The pulsation of air flowing through the intake flow path 20 when the above-mentioned Miller cycle or EGR is performed is a pulsation having a higher frequency component than the pulsation of air caused by the intake stroke of the normal cycle. In the pulsation phenomenon, not only the pulsation amplitude ratio but also the pulsation waveform determined by a combination of the pulsation amplitude ratio and the pulsation frequency is important.

Figure 8A:
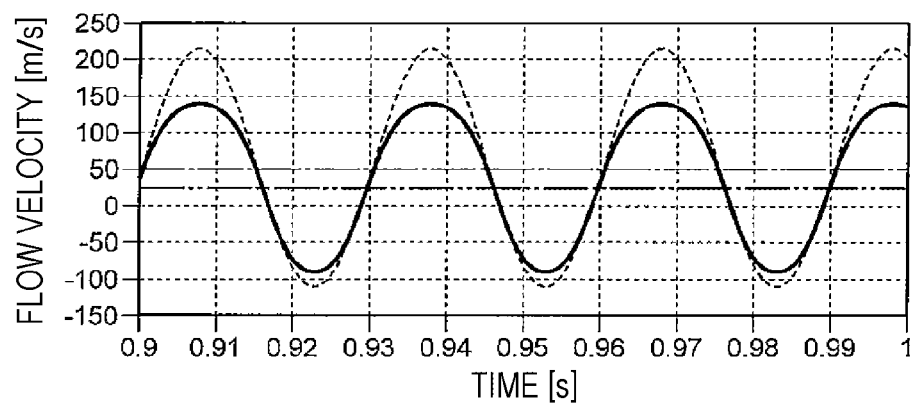
FIG. 8A is a graph showing a flow velocity of a main flow of an intake flow path and a bypass flow of the flow rate sensor.

FIG. 8A is a graph showing a flow velocity of the main flow flowing through the intake flow path 20 when pulsation occurs and a flow velocity of the bypass flow flowing through the bypass passage of the flow rate sensor 21s. In FIG. 8A, the flow velocity of the main flow is shown by a broken line, and the flow velocity of the bypass flow is shown by a solid line. As described above, the bypass passage of the flow rate sensor 21s has a smaller inner diameter than the intake flow path 20 which is the main passage and includes a curved shape. Accordingly, the bypass passage has a pressure loss larger than that of the main passage. Further, the effect of the pressure loss becomes larger as the absolute value of the flow velocity increases. For this reason, the pulsation waveforms of the flow velocities of the main flow and the bypass flow differ in the vicinity of the peak, and the average values of the flow velocities of the main flow and the bypass flow show different values.

Figure 8B:
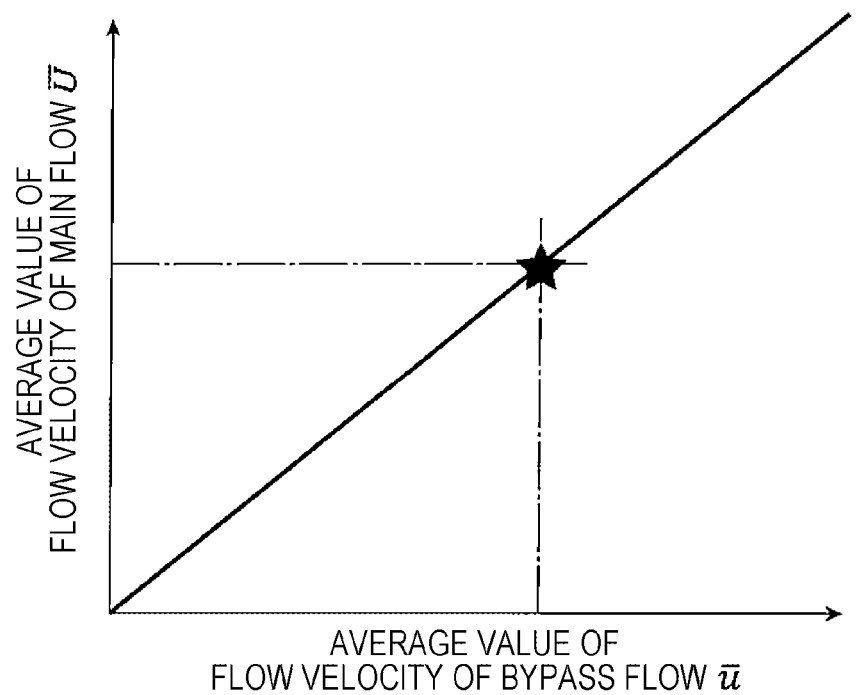
FIG. 8B is a graph showing a relationship between average flow velocities of the main flow of the intake flow path and the bypass flow of the flow rate sensor.

FIG. 8B shows a graph showing a relationship between the average value of the flow velocity of the main flow which is air flowing through the intake flow path 20 at a position where the flow rate sensor 21s is provided and the average value of the flow velocity of the bypass flow of air flowing through the bypass passage of the flow rate sensor 21s. The flow rate sensor 21s is intended to measure a flow rate of the entire air passing through a portion in which the flow rate sensor 21s is provided in the intake flow path 20. For this reason, it is necessary to calculate the flow velocity of the main flow from the flow velocity of the bypass flow flowing through the bypass passage of the flow rate sensor 21s. By matching the relationship between the average flow velocity of the bypass flow and the average flow velocity of the main flow, the flow velocity of the main flow can be calculated from the flow velocity of the bypass flow.

Figure 9A:
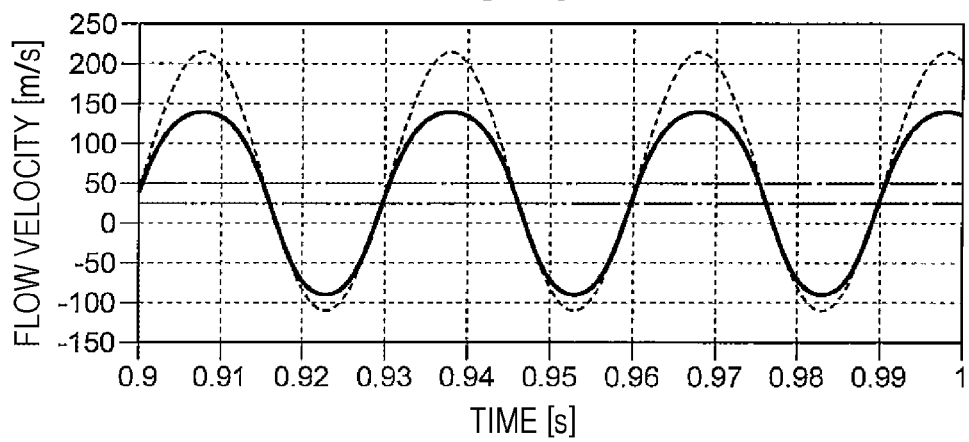
FIG. 9A is a graph showing a relationship between flow velocities of the main flow of the intake flow path and the bypass flow of the flow rate sensor.
Figure 9B:
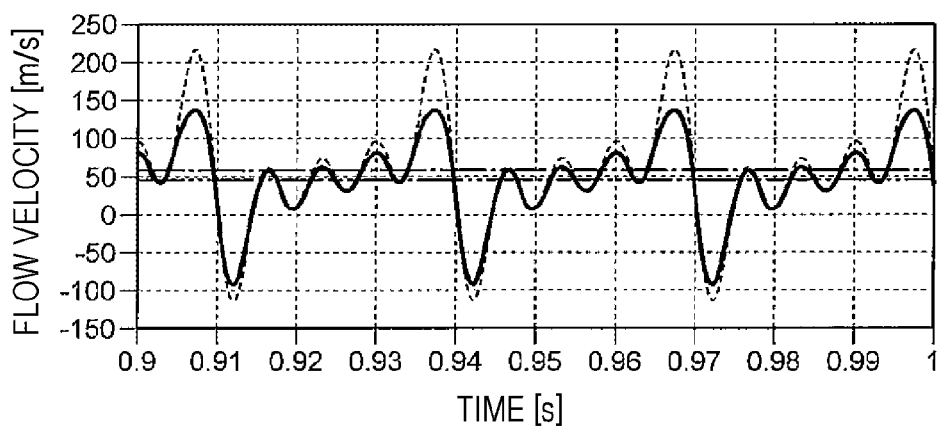
FIG. 9B is a graph similar to that of FIG. 9A when the late closing Miller cycle is performed.
Figure 9C:
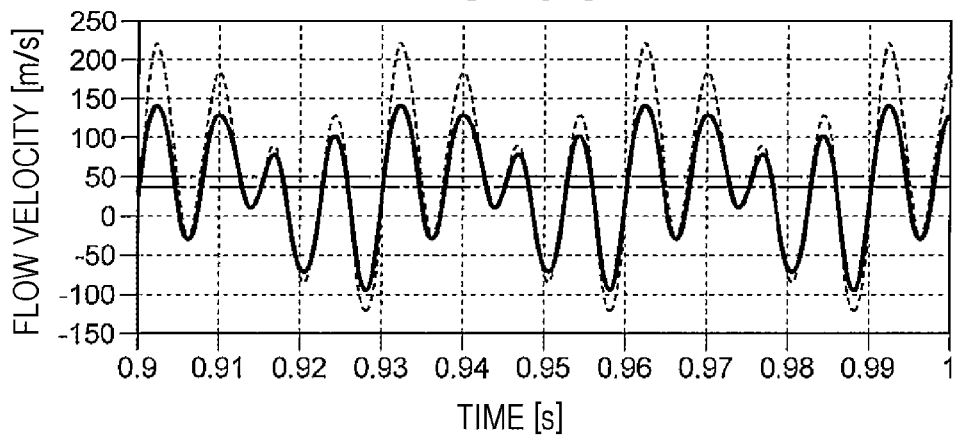
FIG. 9C is a graph similar to that of FIG. 9A when EGR is introduced.

FIG. 9A is a graph similar to that of FIG. 8A showing the relationship between the flow velocity of the main flow and the flow velocity of the bypass flow. FIG. 9B is a graph similar to that of FIG. 9A when the late closing Miller cycle shown in FIG. 7B is performed. FIG. 9C is a graph similar to that of FIG. 9A when EGR shown in FIG. 7C is introduced.

Figure 9D:
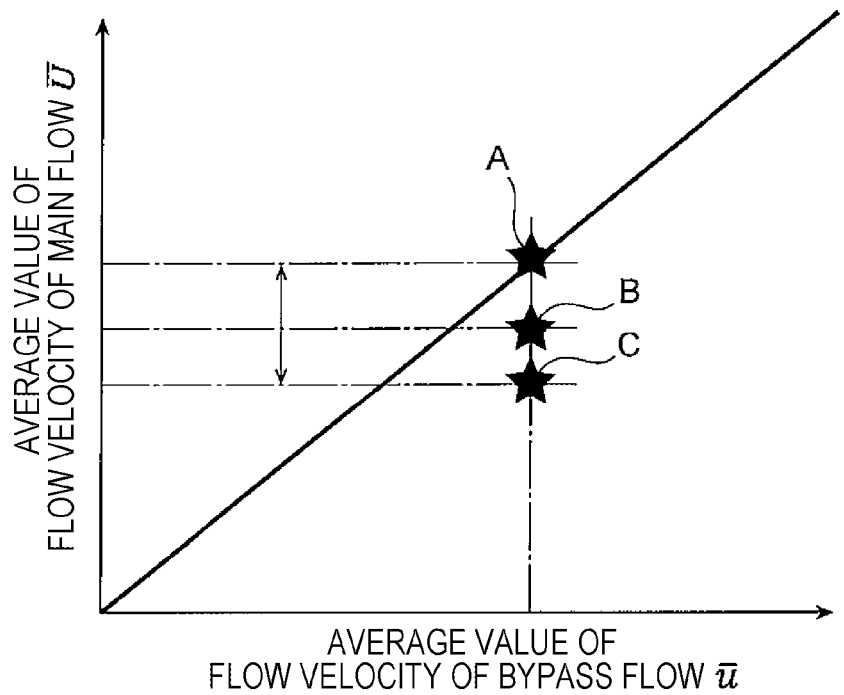
FIG. 9D is a graph showing a matching result of the average flow velocities of the bypass flow and the main flow.

FIG. 9D is a graph showing matching results A, B, and C of the average value of the flow velocity of the bypass flow shown by a solid line and the average value of the flow velocity of the main flow shown by a broken line in FIGS. 9A to 9C.

In FIGS. 9A to 9C, the average values (dashed line) and the pulsation amplitude ratios of the flow velocity of the main flow shown by the broken line are the same. Even when the average values and the pulsation amplitude ratios of the flow velocity of the main flow are the same, if the pulsation waveforms of the flow velocity of the main flow are different, the matching results A, B, and C of the average values (chain double-dashed line) of the flow velocity of the bypass flow and the average values (dashed line) of the flow velocity of the main flow are different as shown in FIGS. 9A to 9D. For this reason, the matching results A, B, and C according to a pulsation condition of the flow velocity of the main flow are required.

Next, the arithmetic device 100 constituting the internal combustion engine control device 60 of the present embodiment shown in FIG. 2 will be described in more detail. As described above, the arithmetic device 100 of the present embodiment includes the fundamental frequency derivation unit 104, the flow rate amplitude calculation unit 107, the correction amount derivation unit 108, and the flow rate calculation unit 109. Further, the arithmetic device 100 includes, for example, an A/D conversion unit 101, a voltage/flow rate conversion unit 102, a rotational speed calculation unit 103, a radio frequency calculation unit 105, and a pre-correction flow rate calculation unit 106.

The A/D conversion unit 101 converts an analog voltage signal output from the flow rate sensor 21s into a digital signal by an A/D converter.

The voltage/flow rate conversion unit 102 includes, for example, a voltage/flow rate conversion table. The voltage/flow rate conversion table is a table for converting a voltage, which is an output value of the flow rate sensor 21s, into a flow rate of air flowing in the vicinity of a sensor element disposed in the bypass flow path of the flow rate sensor 21s. For example, the voltage/flow rate conversion unit 102 converts a voltage value, which is an output value of the flow rate sensor 21s converted into a digital signal, into a flow rate signal corresponding to the output value of the flow rate sensor 21s and outputs the flow rate signal.

More specifically, the voltage/flow rate conversion table shows a relationship between an intake air amount and an output signal of a general hot wire air flow sensor. A voltage/flow rate curve in the voltage/flow rate conversion table is a non-linear curve showing that a voltage of the output signal is low when a flow rate of the air flowing through the intake flow path 20, that is, the intake air amount is small, and the voltage of the output signal is high when the intake air amount is large. The reason for this non-linear characteristic is that, for an air amount Q when a detection signal from the heat generating resistor that constitutes the sensor element of the flow rate sensor 21s is converted into an air amount, the following Equation (1) called King's formula is employed:

$$Ih \cdot Rh = (\alpha + \beta \cdot \sqrt{Q}) \cdot (Th - Ta) \tag{1}$$

In Equation (1) described above, Ih is a current value of the heat generating resistor, Rh is a resistance value of the heat generating resistor, Th is a surface temperature of the heat generating resistor, Ta is a temperature of air, Q is an air amount, and $\alpha$ and $\beta$ are constants determined by the specifications of the heating resistance. Generally, since the current value Ih of the heating resistance is controlled so that (Th−Ta) becomes constant, the air amount is converted into a voltage value V by the voltage drop of the resistor and detected. As a result, the voltage value V becomes a quartic function. For this reason, when the voltage is converted into the flow rate of air, the curvature of the quartic curve, that is, the relationship between the output and the air amount becomes non-linear.

The rotational speed calculation unit 103 calculates the rotational speed of the internal combustion engine 10 based on a signal of the crank angle sensor 16.

The fundamental frequency derivation unit 104 derives, for example, a fundamental frequency which is a frequency of the pulsation amplitude of the air flowing through the intake flow path 20 based on the rotational speed and the number of cylinders of the internal combustion engine 10. More specifically, the air flow at the position of the flow rate sensor 21s of the intake flow path 20 causes pulsation according to the rotational speed and the number of cylinders of the internal combustion engine 10 as shown in FIG. 7A. The fundamental frequency derivation unit 104 can include, for example, a table or an arithmetic expression that records a relationship between the rotational speed of the internal combustion engine 10 and the frequency of the flow rate waveform of air at the position of the flow rate sensor 21s of the intake flow path 20. In this manner, the fundamental frequency derivation unit 104 can derive the fundamental frequency, which is a frequency of the pulsation waveform of the flow rate of air according to the rotational speed of the internal combustion engine 10.

The radio frequency calculation unit 105 calculates a radio frequency based on the rotational speed of the internal combustion engine 10. Here, the radio frequency is, for example, a plurality of frequencies equal to or higher than the fundamental frequency included in the pulsation waveform of the flow rate of air according to the rotational speed of the internal combustion engine 10. This radio frequency is, for example, a plurality of specific frequencies or a plurality of specific frequency bands equal to or higher than the fundamental frequency. The calculation method or derivation method for a plurality of frequencies or a plurality of frequency bands is not particularly limited. As an example, a plurality of radio frequencies according to the number of revolutions and operation condition of the internal combustion engine 10 can be set in advance as a map, and the map can be referred to according to the number of revolutions and operation condition of the internal combustion engine 10.

The pre-correction flow rate calculation unit 106 calculates a pre-correction flow rate based on, for example, a flow rate signal based on the output value of the flow rate sensor 21s output from the voltage/flow rate conversion unit 102 and a fundamental frequency output from the fundamental frequency derivation unit 104. More specifically, the pre-correction flow rate calculation unit 106 includes, for example, a low-pass filter that allows a low frequency having a frequency equal to or lower than the fundamental frequency or a low frequency having a frequency lower than the fundamental frequency to pass through. In this manner, the pre-correction flow rate calculation unit 106 extracts a signal having a frequency equal to the fundamental frequency or a frequency lower than the fundamental frequency from the flow rate signal based on the output value of the flow rate sensor 21s output from the voltage/flow rate conversion unit 102, and outputs the signal as a pre-correction flow rate.

The flow rate amplitude calculation unit 107 extracts a radio frequency of a plurality of frequencies equal to or higher than the fundamental frequency from the pulsation waveform based on the output value of the flow rate sensor 21s output from the voltage/flow rate conversion unit 102 as a flow rate radio frequency, and calculates an amplitude of the flow rate radio frequency for each frequency. More specifically, t flow rate amplitude calculation unit 107 can include, for example, a low-pass filter and a plurality of band-pass filters. The low pass filter allows, for example, a signal having a frequency equal to the fundamental frequency or lower than the fundamental frequency to pass through. The band-pass filter is set according to, for example, the radio frequency calculated by the radio frequency calculation unit 105.

The correction amount derivation unit 108 derives a pulsation correction amount, which is a correction amount, based on the amplitude of the flow rate radio frequency for each frequency output from the flow rate amplitude calculation unit 107. The correction amount derivation unit 108 can include, for example, a neural network model described later and a correction map as described below.

Figure 10A:
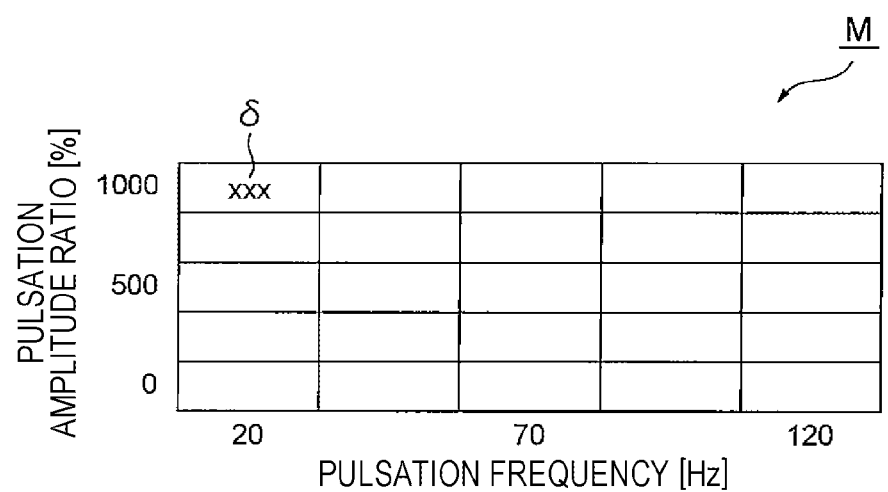
FIG. 10A is an explanatory diagram of a correction map of a correction amount derivation unit shown in FIG. 2.

FIG. 10A is an explanatory diagram of a case where the correction amount derivation unit 108 includes a correction map M. The correction map M shown in FIG. 10A is, for example, a table based on an amplitude of the flow rate radio frequency for each frequency. More specifically, the correction map M is, for example, a table that records a plurality of correction amounts δ corresponding to a plurality of combinations of a value of a pulsation frequency and a value of a pulsation amplitude ratio. Here, the pulsation amplitude ratio is a value obtained by dividing an amplitude of the flow rate radio frequency by an average value of the flow rate radio frequency. The pulsation frequency is a frequency of the flow rate radio frequency.

Figure 10B:
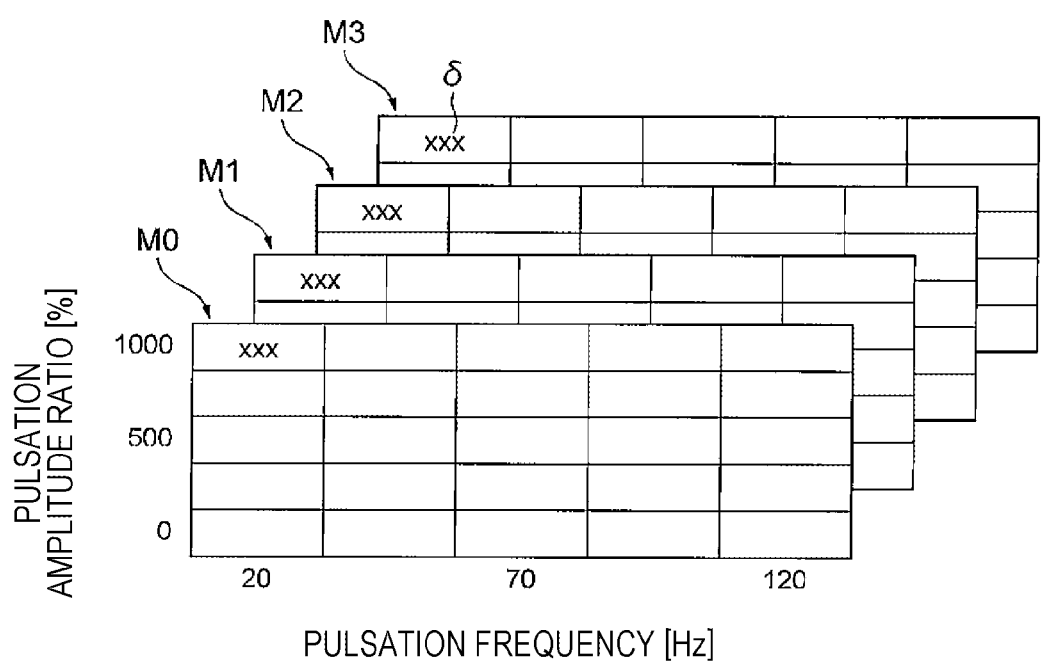
FIG. 10B is an explanatory diagram of a multidimensional correction map of the correction amount derivation unit shown in FIG. 2.

FIG. 10B is an explanatory diagram of a case where the correction amount derivation unit 108 includes multidimensional correction maps M0, M1, M2, and M3. As explained with reference to FIGS. 9A to 9D, when, for example, operation conditions of the internal combustion engine 10 are different, the matching results A, B, and C of the average value of the flow velocity of the bypass flow of the flow rate sensor 21s and the average value of the flow velocity of the main flow flowing through the intake flow path 20 at the position of the flow rate sensor 21s are different.

For this reason, the correction amount derivation unit 108 can include, for example, the correction map M0 under a reference condition, the correction map M1 under a Miller cycle condition, and the correction map M2 under an EGR condition. Note that, since the Miller cycle control and the EGR control have an intermediate state, the correction amount derivation unit 108 needs to appropriately interpolate the intermediate state. Further, an outside air condition, which affects the sound speed, is an influential factor of the pulsation waveform. For this reason, the correction map M3 according to outside air conditions such as air temperature and atmospheric pressure may be included.

The flow rate calculation unit 109 uses the pre-correction flow rate calculated from the output value of the flow rate sensor 21s by the pre-correction flow rate calculation unit 106 and the pulsation correction amount which is a correction amount derived by the correction amount derivation unit 108 to calculate a flow rate of air flowing through the intake flow path 20 at the position of the flow rate sensor 21s.

That is, the flow rate calculation unit 109 corrects a flow rate based on the output value of the flow rate sensor 21s by the correction amount derived by the correction amount derivation unit 108, and outputs the flow rate of air flowing through the intake flow path 20 at the position of the flow rate sensor 21s.

Hereinafter, a control method of the internal combustion engine 10 by the internal combustion engine control device 60 of the present embodiment will be described.

Figure 11:
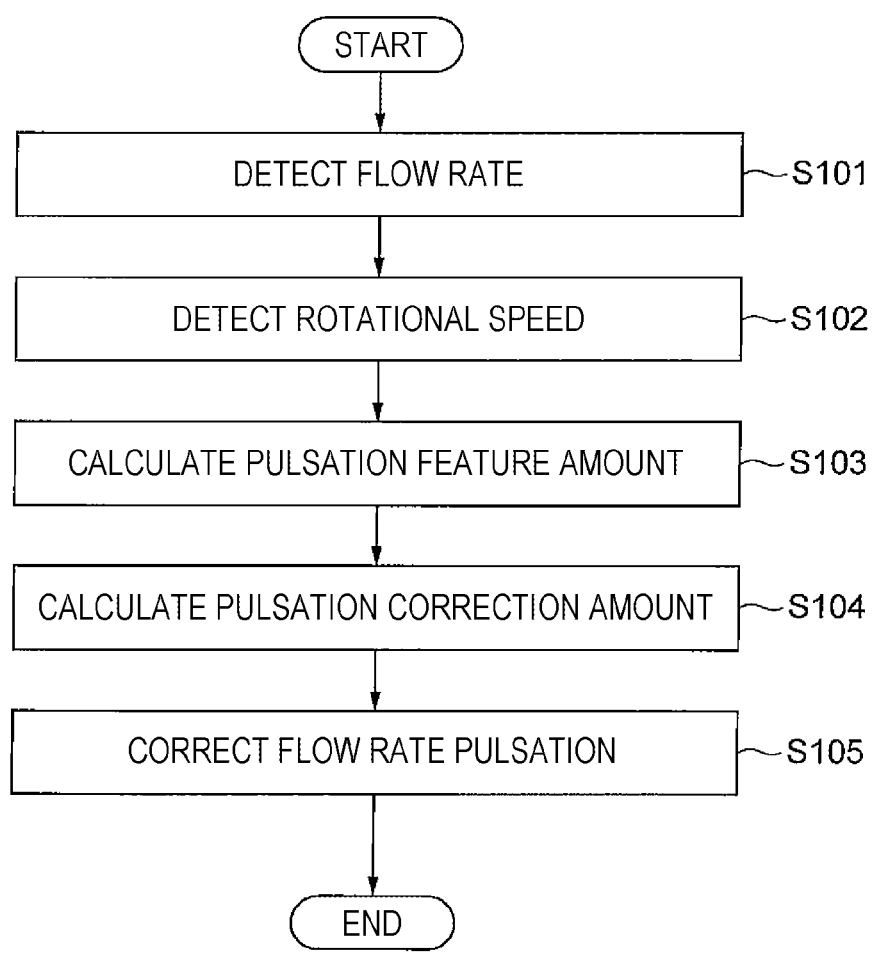
FIG. 11 is a flow chart of a control method for an internal combustion engine using the internal combustion engine control device according to the first embodiment.

FIG. 11 is a flow chart showing each step of the control method of the internal combustion engine 10 by the internal combustion engine control device 60 of the present embodiment.

The arithmetic device 100 of the internal combustion engine control device 60 detects a flow rate of the bypass flow flowing through the bypass flow path of the flow rate sensor 21s in Step S101 shown in FIG. 11. As shown in FIG. 2, the arithmetic device 100 converts, for example, the output value of the flow rate sensor 21s into a digital value by the A/D conversion unit 101, and further converts the value into a flow rate by the voltage/flow rate conversion unit 102. The flow rate output from the voltage/flow rate conversion unit 102 is input to the pre-correction flow rate calculation unit 106 and the flow rate amplitude calculation unit 107.

Figure 12A:
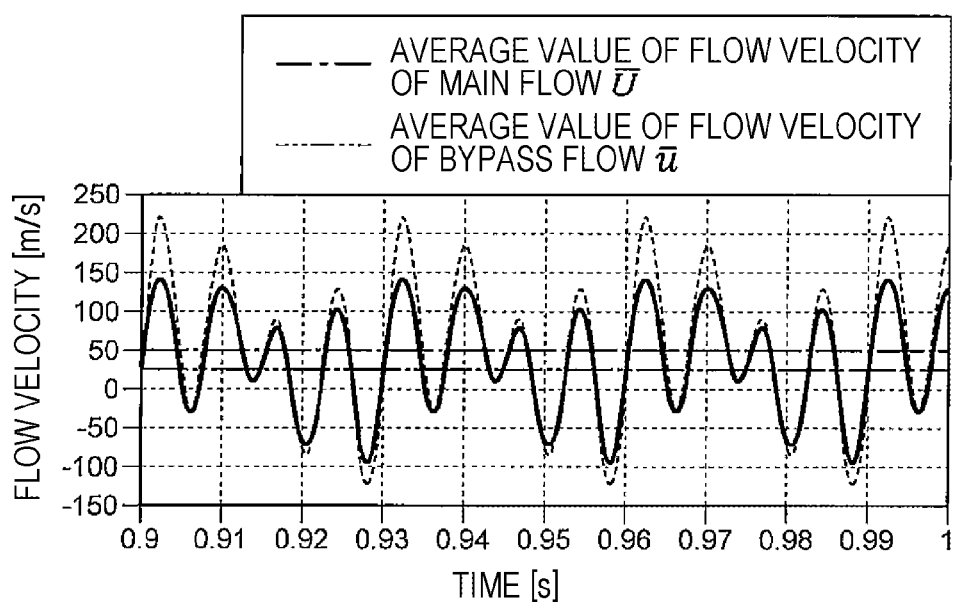
FIG. 12A is a graph showing an example of a pulsation waveform of a flow rate based on an output value of the flow rate sensor.

FIG. 12A is a graph showing an example of the pulsation waveform of a flow rate based on the output value of the flow rate sensor 21s output from the voltage/flow rate conversion unit 102. In FIG. 12A, the flow rate of air flowing through the intake flow path 20 at the position of the flow rate sensor 21s is represented by a broken line, and the flow rate based on the output value of the flow rate sensor 21s output from the voltage/flow rate conversion unit 102 is represented by a solid line. As described above, the flow rate of the air flowing through the intake flow path 20 at the position of the flow rate sensor 21s and the average value of the flow rate and the flow rate based on the output value of the flow rate sensor 21s and the average value of the flow rate are different.

In subsequent Step S102, the arithmetic device 100 detects the rotational speed of the internal combustion engine 10. The arithmetic device 100 calculates, for example, the rotational speed of the internal combustion engine 10 based on the crank angle sensor 16 by the rotational speed calculation unit 103. The rotational speed of the internal combustion engine 10 output from the rotational speed calculation unit 103 is input to the fundamental frequency derivation unit 104 and the radio frequency calculation unit 105. In subsequent Step S103, the arithmetic device 100 calculates a pulsation feature amount.

Figure 12B:
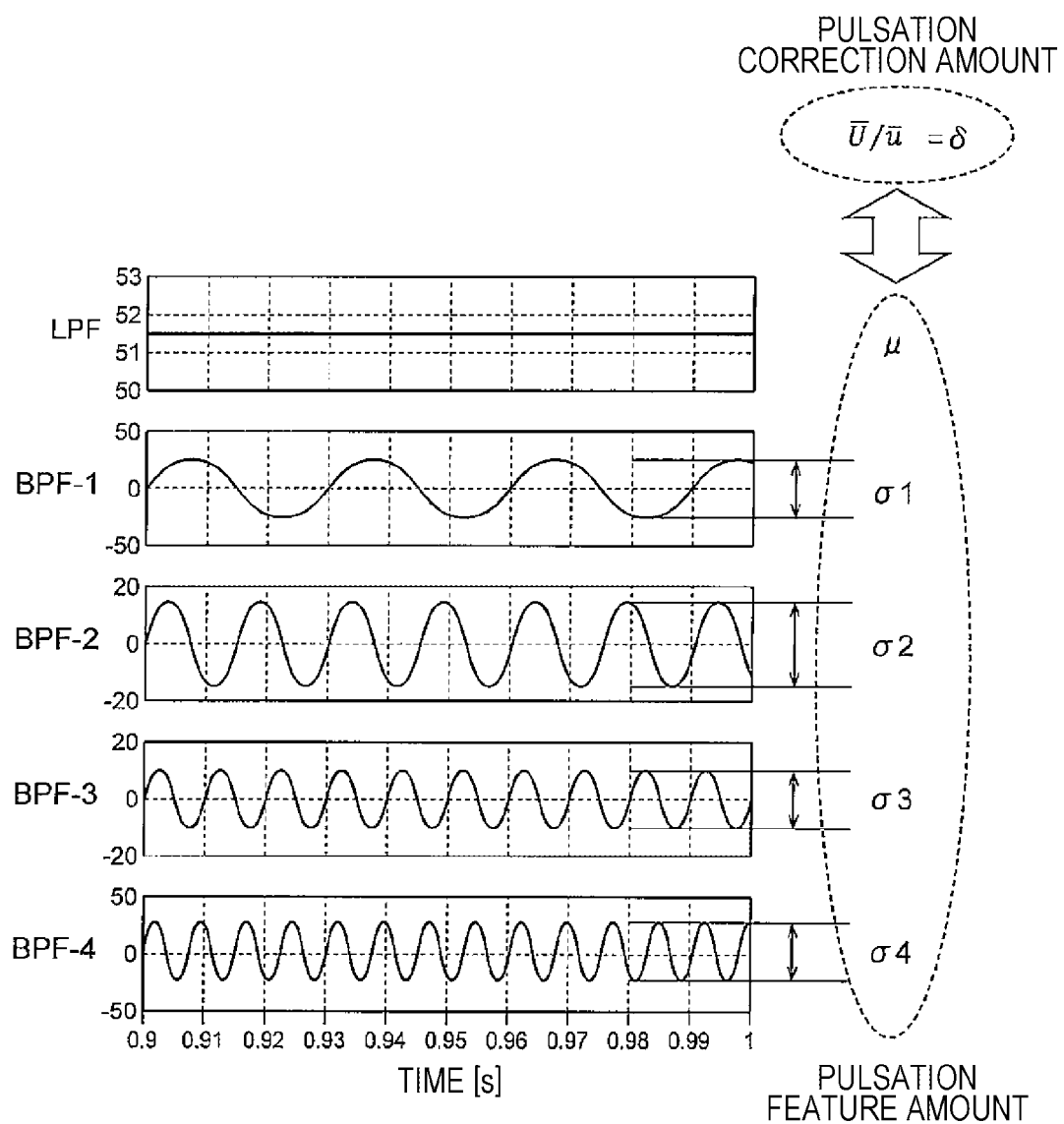
FIG. 12B is an explanatory diagram of a method of calculating a pulsation feature amount from the pulsation waveform shown in FIG. 12A.

FIG. 12B is an explanatory diagram of a method of calculating the pulsation feature amount from the pulsation waveform of the flow rate based on the output value of the flow rate sensor 21s shown in FIG. 12A. In Step S103, the arithmetic device 100 derives the fundamental frequency corresponding to the rotational speed of the internal combustion engine 10 by the fundamental frequency derivation unit 104. As described above, the fundamental frequency is a frequency corresponding to the rotational speed of the internal combustion engine 10 in the pulsation waveform of the flow rate of air flowing through the intake flow path 20.

Further, in Step S103, the arithmetic device 100 calculates a radio frequency based on the rotational speed of the internal combustion engine 10 by the radio frequency calculation unit 105. Then, the flow rate amplitude calculation unit 107 extracts a radio frequency of a plurality of frequencies equal to or higher than the fundamental frequency from the pulsation waveform based on the output value of the flow rate sensor 21s shown in FIG. 12A as a flow rate radio frequency, and calculates amplitudes σ1, σ2, σ3, σ4, . . . , σn of the flow rate radio frequency for each frequency.

More specifically, for example, flow velocity information μ corresponding to the average value in one cycle of the internal combustion engine 10 can be obtained from the pulsation waveform based on the output value of the flow rate sensor 21s shown in FIG. 12A by a low-pass filter LPF of the flow rate amplitude calculation unit 107. Furthermore, from the same pulsation waveform, a radio frequency of a plurality of frequencies equal to or higher than the fundamental frequency is extracted as a flow rate radio frequency by band-pass filters BPF-1, BPF-2, BPF-3, BPF-4, . . . , BPF-n of the flow rate amplitude calculation unit 107, and the amplitudes σ1, σ2, σ3, σ4, . . . , σn of the flow rate radio frequency can be calculated for each frequency. This makes it possible to calculate the pulsation amplitude ratio of the flow rate radio frequency for each frequency.

In subsequent Step S104, the arithmetic device 100 calculates the pulsation correction amount. In the arithmetic device 100, for example, the correction amount derivation unit 108 derives the correction amount δ based on the flow velocity information μ corresponding to the average value in one cycle of the internal combustion engine 10 and the amplitudes σ1, σ2, σ3, σ4, . . . , σn of the flow rate radio frequency for each frequency. The correction amount derivation unit 108 can derive the correction amount δ by, for example, the above-mentioned correction map M, the multidimensional correction maps M0, M1, M2, M3, ..., Mn, or the neural network model.

The original pulsation waveform can be restored by multiplying all of the flow rate radio frequencies, which are the pulsation waveform information separated for each frequency, by a weight and synthesizing them. That is, by replacing the information of the pulsation waveform with information of the pulsation frequency and pulsation amplitude, it is possible to organize the pulsation correction amount for various pulsation waveforms. According to this idea, the pulsation correction amount can be obtained based on the multidimensional correction maps M0, M1, M2, and M3 with the pulsation amplitude ratio for each pulsation frequency as each axis, as described above.

In subsequent Step S105, the arithmetic device 100 corrects the pulsation of the flow rate based on the output value of the flow rate sensor 21s. In the arithmetic device 100, for example, the flow rate calculation unit 109 uses the pre-correction flow rate based on the output value of the flow rate sensor 21s output from the pre-correction flow rate calculation unit 106 and the correction amount δ output from the correction amount derivation unit 108 to calculate a flow rate of air flowing through the intake flow path 20 at the position of the flow rate sensor 21s. The flow rate of air calculated by the flow rate calculation unit 109 is input to, for example, an in-cylinder air amount estimation unit that estimates an air amount in the cylinder.

As described above, the internal combustion engine control device 60 of the present embodiment is a device that includes the arithmetic device 100 and controls the internal combustion engine 10 using the output value of the flow rate sensor 21s that measures the flow rate of the air flowing through the intake flow path 20. As described above, the arithmetic device 100 includes the fundamental frequency derivation unit 104 that derives a fundamental frequency that is a frequency of the pulsation waveform of the flow rate of air according to the rotational speed of the arithmetic device 100, the flow rate amplitude calculation unit 107 that extracts a radio frequency of a plurality of frequencies equal to or higher than the fundamental frequency from the pulsation waveform based on the output value of the flow rate sensor 21s as the flow rate radio frequency and calculates an amplitude of the flow rate radio frequency for each frequency, the correction amount derivation unit 108 that derives the correction amount based on the amplitude of the flow rate radio frequency for each frequency, and the flow rate calculation unit 109 that calculates the flow rate of air flowing through the intake flow path 20 using the output value of the flow rate sensor 21s and the correction amount.

With this configuration, it is possible to correct the flow rate based on the output value of the flow rate sensor 21s by using the correction amount δ derived based on the amplitude of the flow rate radio frequency for each frequency. For this reason, the measurement accuracy of the flow rate sensor 21s can always be ensured even under operation conditions in which the flow rate sensor 21s is conventionally liable to have an error due to pulsation. That is, the present embodiment can provide the internal combustion engine control device 60 capable of further reducing an error between a corrected air flow rate and an actual air flow rate as compared to the conventional device by more appropriately correcting the output value of the flow rate sensor 21s that measures a flow rate of air flowing through the intake flow path 20 of the internal combustion engine 10. In this manner, the accuracy of air-fuel ratio control is improved, and the exhaust gas of the internal combustion engine 10 can be prevented from deteriorating.

Note that, in the present embodiment, a system in which a voltage signal corresponding to an air amount is output as a voltage value is employed. However, a system in which the voltage signal is converted to a frequency signal by conversion by a voltage-frequency conversion circuit and output can also be employed. Further, although not shown, in a case where a voltage signal corresponding to an air amount is input as a voltage-frequency converted frequency signal, a period of the signal is measured at port input of the CPU, so that a period or a value of a period converted into a frequency is input, and an air amount conversion table is converted into a detected air amount by search interpolation calculation from a value stored in advance according to a period or a frequency.

Second Embodiment

Next, the internal combustion engine control device according to a second embodiment of the present disclosure will be described with reference to FIGS. 13 to 16 by applying FIGS. 1 to 9D and FIGS. 12A and 12B.

Figure 13:
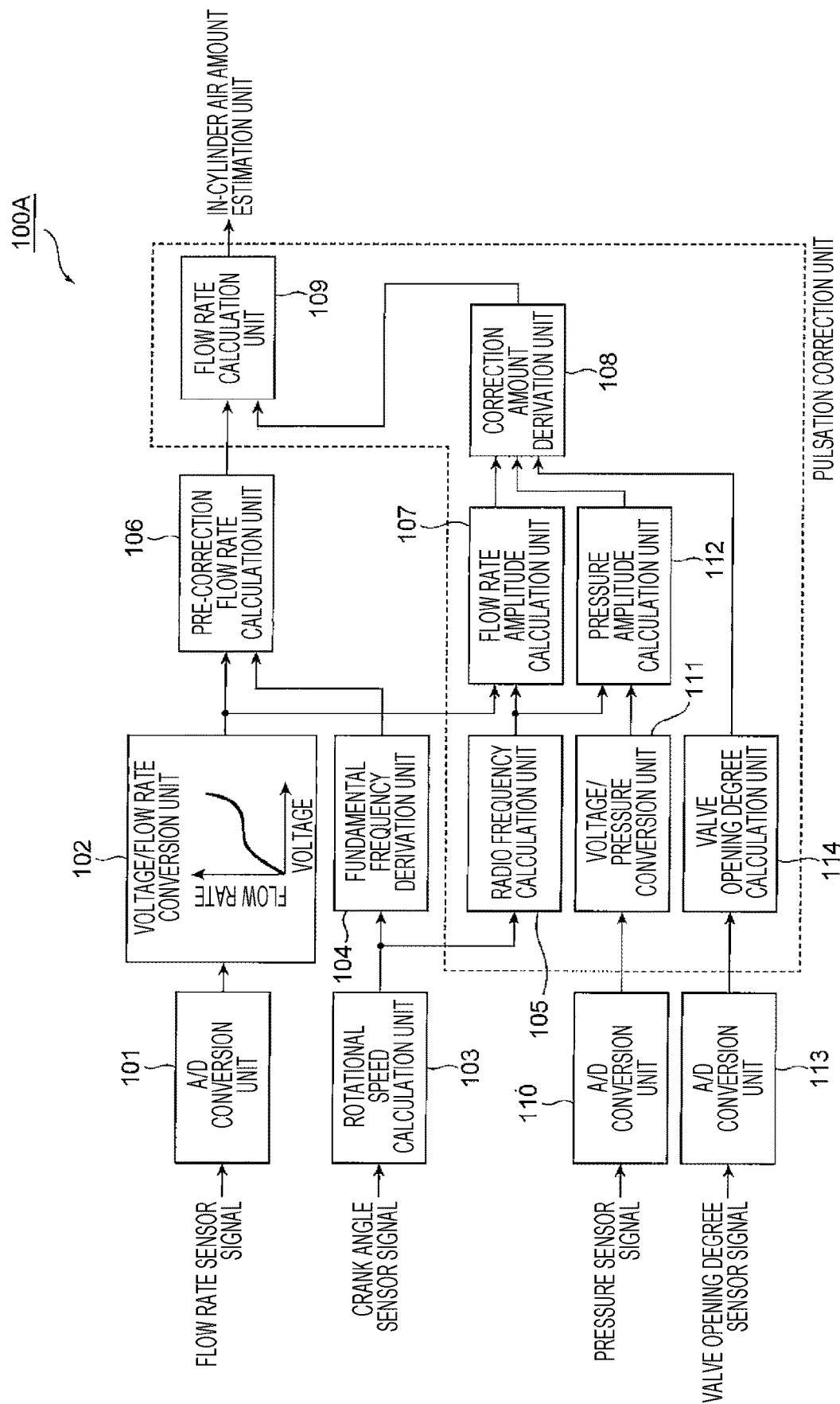
FIG. 13 is a block diagram of the internal combustion engine control device according to a second embodiment of the present disclosure.

FIG. 13 is a block diagram of an arithmetic device 100A included in the internal combustion engine control device according to the second embodiment of the present disclosure. The arithmetic device 100A of the present embodiment is different from the arithmetic device 100 according to the first embodiment described above in that the arithmetic device 100A mainly includes a pressure amplitude calculation unit 112. The other configurations of the arithmetic device 100A of the present embodiment, which are similar to those of the arithmetic device 100 according to the first embodiment described above, are given the same reference numerals and will be omitted from the description.

Similar to the arithmetic device 100 shown in FIG. 2, the arithmetic device 100A includes the A/D conversion unit 101, the voltage/flow rate conversion unit 102, the rotational speed calculation unit 103, the fundamental frequency derivation unit 104, the radio frequency calculation unit 105, the pre-correction flow rate calculation unit 106, the flow rate amplitude calculation unit 107, and the correction amount derivation unit 108.

Furthermore, the arithmetic device 100A includes, for example, A/D conversion units 110 and 113, a voltage/pressure conversion unit 111, a pressure amplitude calculation unit 112, and a valve opening degree calculation unit 114.

The A/D conversion unit 110 converts, from analog to digital, a voltage signal as an output value of the supercharging pressure sensor 23a, which is a pressure sensor that measures the pressure of air flowing through the intake flow path 20. The voltage/pressure conversion unit 111 converts the digital signal of the output value of the supercharging pressure sensor 23a output from the A/D conversion unit 110 into pressure information.

To the pressure amplitude calculation unit 112, for example, the fundamental frequency is input from the radio frequency calculation unit 105. Similar to the flow rate amplitude calculation unit 107, the pressure amplitude calculation unit 112 extracts a radio frequency of a plurality of frequencies equal to or higher than the fundamental frequency from the pulsation waveform based on the output value of the supercharging pressure sensor 23a as a pressure radio frequency, and calculates an amplitude of the pressure radio frequency for each frequency. The pressure information output from the pressure amplitude calculation unit 112 and the amplitude of the pressure radio frequency for each frequency are input to the correction amount derivation unit 108.

The A/D conversion unit 113 converts, from analog to digital, a voltage signal, which is an output value of a sensor that detects the opening degree of the throttle valve 22c. The valve opening degree calculation unit 114 converts the digital signal of the output value of the sensor that detects the opening degree of the throttle valve 22c into valve opening degree information. The valve opening degree information output from the valve opening degree calculation unit 114 is input to the correction amount derivation unit 108. The correction amount derivation unit 108 derives the correction amount δ based on the amplitude of the flow rate radio frequency for each frequency, the amplitude of the pressure radio frequency for each frequency, and the opening degree of the throttle valve 22c which is a valve that controls a flow rate of air flowing through the intake flow path between the flow rate sensor and the pressure sensor.

That is, the arithmetic device 100A of the present embodiment includes the pressure amplitude calculation unit 112 that extracts a radio frequency of a plurality of frequencies equal to or higher than the fundamental frequency from the pulsation waveform based on the output value of the supercharging pressure sensor 23a, which is a pressure sensor that measures pressure of air flowing through the intake flow path 20, as a pressure radio frequency, and calculates an amplitude of the pressure radio frequency for each frequency. Then, the correction amount derivation unit 108 derives the correction amount δ based on the amplitude of the flow rate radio frequency for each frequency, the amplitude of the pressure radio frequency for each frequency, and the opening degree of the throttle valve 22c which is a valve that controls a flow rate of air flowing through the intake flow path 20 between the flow rate sensor 21s and the supercharging pressure sensor 23a which is a pressure sensor.

Figure 14:
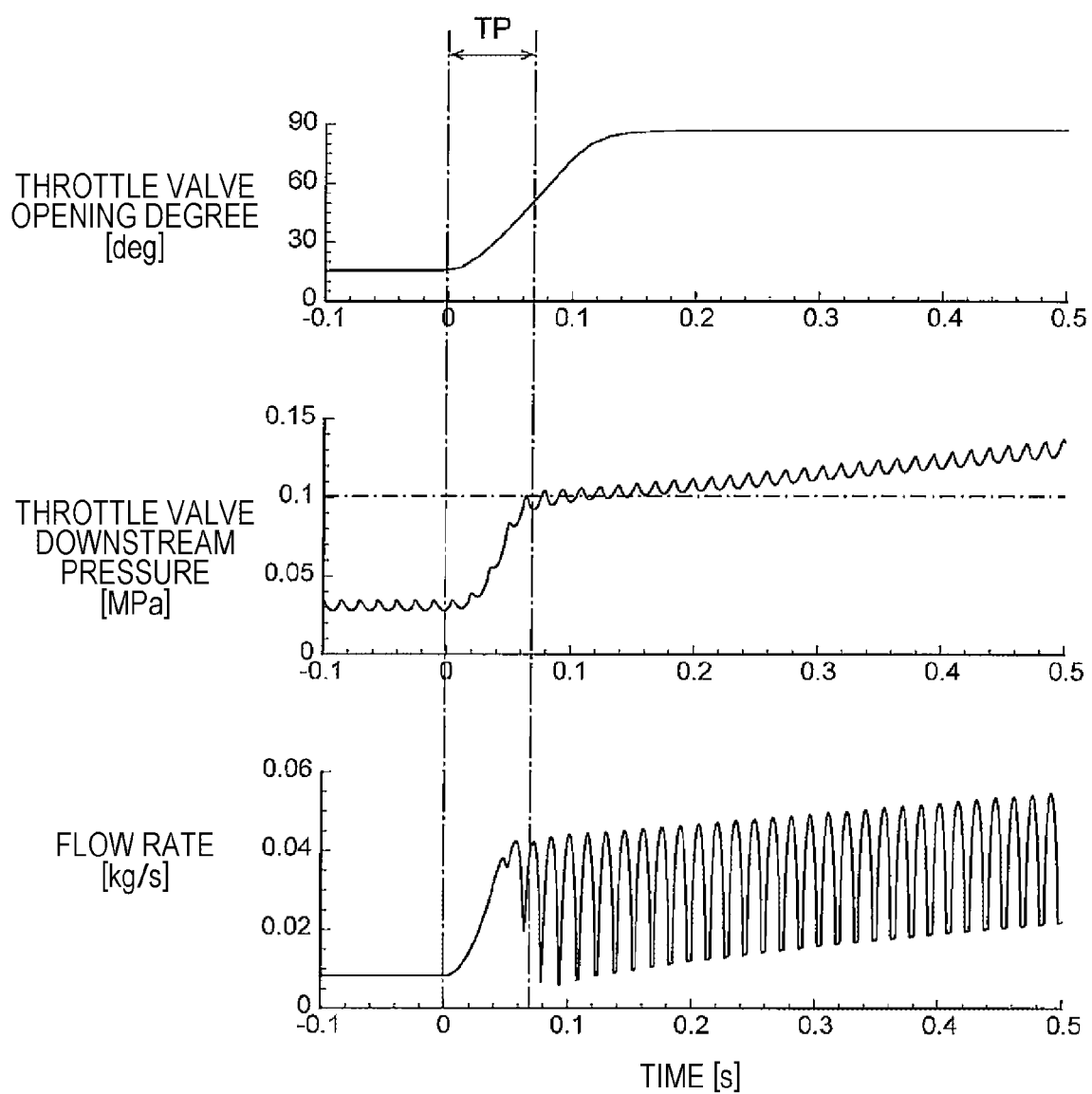
FIG. 14 is a graph showing a throttle valve opening degree, a throttle valve downstream pressure, and a flow rate of air.

FIG. 14 is a graph showing the opening degree of the throttle valve 22c when accelerating from a throttling state to a supercharging state as the throttle valve 22c is opened, pressure on the downstream side of the throttle valve 22c measured by the supercharging pressure sensor 23a, and a flow rate of the air flowing through the intake flow path 20. During acceleration from the non-supercharged region to the supercharged region, no pulsation occurs in the flow rate of the air flowing through the intake flow path 20 during a period from the throttling state until the throttle valve 22c is opened and the downstream side of the throttle valve 22c is filled with air at atmospheric pressure.

For this reason, in the arithmetic device 100A of the present embodiment, the flow rate calculation unit 109 is configured to calculate the flow rate of air using only the output value of the flow rate sensor 21s output from the pre-correction flow rate calculation unit 106 in a transition period TP shown in FIG. 14. Here, the transition period TP is a period from when the opening degree of the throttle valve 22c provided in the intake flow path 20 is increased until the output value of the supercharging pressure sensor 23a, which is a pressure sensor that measures the pressure of the throttle valve 22c downstream of the throttle valve 22c, reaches the output value corresponding to the atmospheric pressure.

Figure 15A:
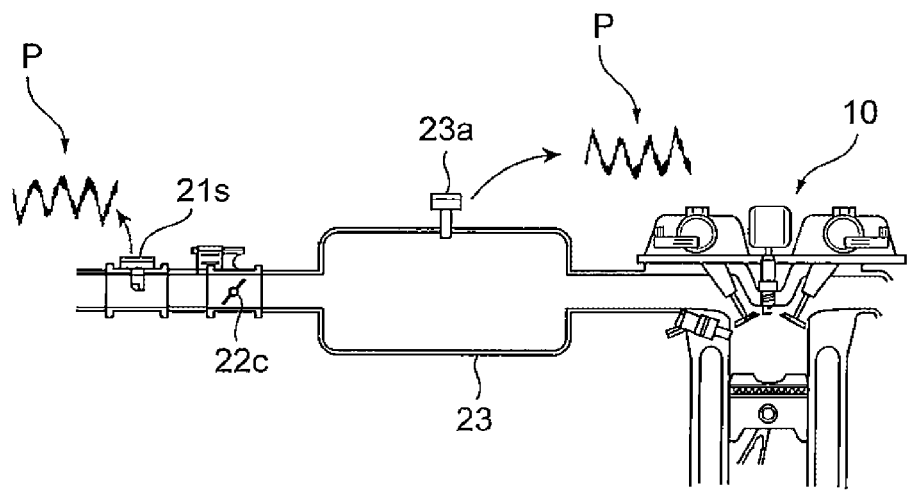
FIG. 15A is an explanatory diagram of an example in which the internal combustion engine control device uses an output value of a supercharging pressure sensor.

FIG. 15A is an explanatory diagram of an example in which the arithmetic device 100A uses the output value of the pressure sensor that measures the pressure of the air flowing through the intake flow path 20. For example, the arithmetic device 100A can detect a pulsation P of air generated by the Miller cycle not only by the flow rate sensor 21s but also by the supercharging pressure sensor 23a which is a pressure sensor. In this case, the information on the pulsation P of the air that changes depending on a control state of the Miller cycle can be directly captured by the supercharging pressure sensor 23a.

Figure 15B:
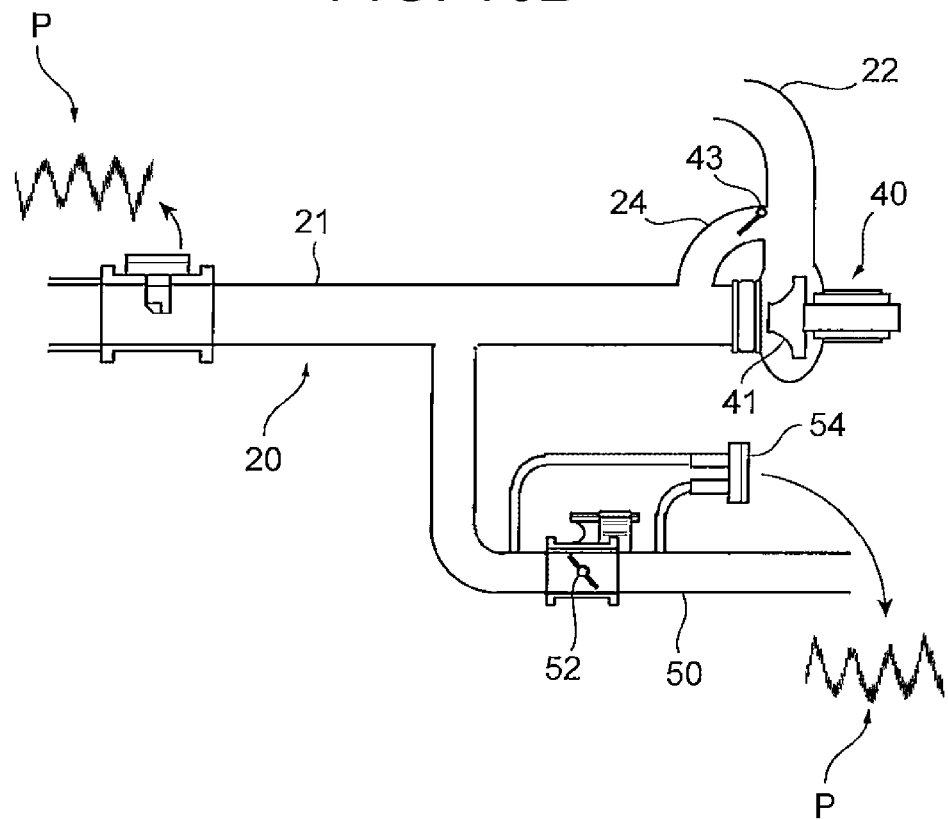
FIG. 15B is an explanatory diagram of an example in which the internal combustion engine control device uses an output value of a differential pressure sensor.

FIG. 15B is an explanatory diagram of an example in which the arithmetic device 100A uses the output value of the differential pressure sensor that measures the differential pressure of the exhaust gas flowing through the EGR flow path 50. For example, the arithmetic device 100A can detect the pulsation P generated by EGR not only by the flow rate sensor 21s but also by the differential pressure sensor 54. In this case, the information on the pulsation P that changes depending on an EGR rate can be directly captured by the differential pressure sensor 54.

In general, the responsiveness of the supercharging pressure sensor 23a and the differential pressure sensor 54, which are pressure sensors, is high as compared to the responsiveness of the flow rate sensor 21s, and a pulsation component of a higher frequency can be captured.

Further, since the supercharging pressure sensor 23a and the differential pressure sensor 54, which are pressure sensors, are installed at positions close to a pulsation factor, pulsation correction can be performed without delay.

The pulsation detected by the pressure sensor such as the supercharging pressure sensor 23a or the differential pressure sensor 54 is propagated to the flow rate sensor 21s through valves such as the throttle valve 22c and the EGR valve 52 installed between the pressure sensor and the flow rate sensor 21s. For this reason, even if the pulsation detected by the pressure sensor is large, the pulsation is not propagated to the flow rate sensor 21s in a case where the opening degree of the valve is small. For this reason, it is necessary to consider the valve opening degree in the pulsation correction of the flow rate sensor 21s based on pressure pulsation information.

Figure 16:
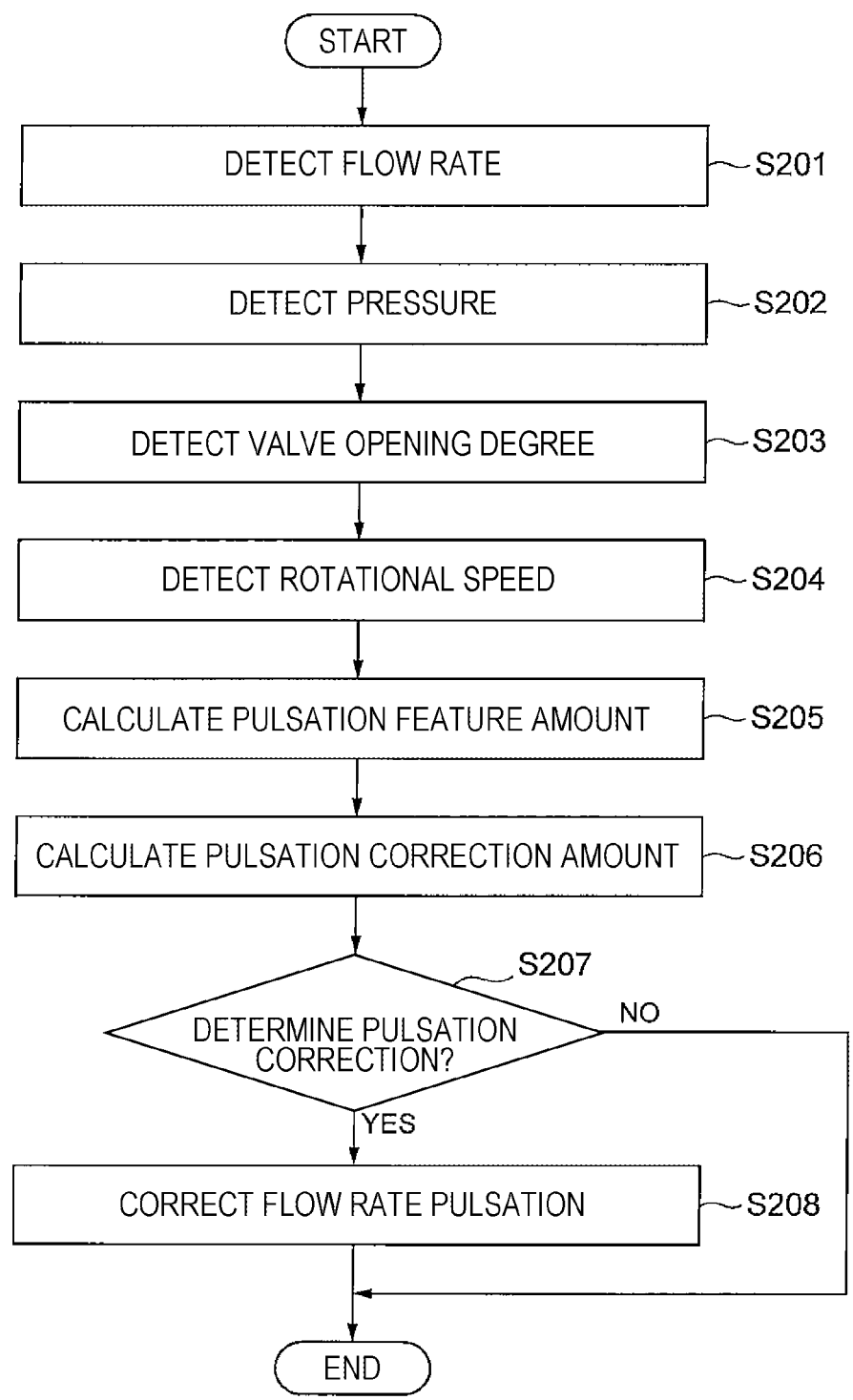
FIG. 16 is a flow chart of an internal combustion engine control method using the control device according to the second embodiment.

Hereinafter, a control method of the internal combustion engine 10 by the internal combustion engine control device of the present embodiment will be described. FIG. 16 is a flow chart showing each step of the control method of the internal combustion engine 10 using the internal combustion engine control device of the present embodiment.

The arithmetic device 100A of the internal combustion engine control device of the present embodiment detects a flow rate of the bypass flow flowing through the bypass flow path of the flow rate sensor 21s in Step S201. The arithmetic device 100A converts, for example, the output value of the flow rate sensor 21s into a digital value by the A/D conversion unit 101, and further converts the value into a flow rate by the voltage/flow rate conversion unit 102. The flow rate output from the voltage/flow rate conversion unit 102 is input to the pre-correction flow rate calculation unit 106 and the flow rate amplitude calculation unit 107.

In subsequent Step S202, the arithmetic device 100A detects the pressure downstream of the throttle valve 22c by the supercharging pressure sensor 23a. The arithmetic device 100A converts, for example, the output value of the supercharging pressure sensor 23a into a digital value by the A/D conversion unit 110, and further converts the value into a pressure by the voltage/pressure conversion unit 111. The pressure output from the voltage/pressure conversion unit 111 is input to the pressure amplitude calculation unit 112.

In subsequent Step S203, the arithmetic device 100A detects the valve opening degree, which is the opening degree of the throttle valve 22c, by a sensor that detects the opening degree of the throttle valve 22c. The arithmetic device 100A converts, for example, the output value of the sensor into a digital value by the A/D conversion unit 113, and further converts the value into the valve opening degree by the valve opening degree calculation unit 114. The valve opening degree output from the valve opening degree calculation unit 114 is input to the correction amount derivation unit 108.

In subsequent Step S204, the arithmetic device 100A detects the rotational speed of the internal combustion engine 10. The arithmetic device 100A calculates, for example, the rotational speed of the internal combustion engine 10 based on the crank angle sensor 16 by the rotational speed calculation unit 103. The rotational speed of the internal combustion engine 10 output from the rotational speed calculation unit 103 is input to the fundamental frequency derivation unit 104 and the radio frequency calculation unit 105.

In subsequent Step S205, the arithmetic device 100A calculates a pulsation feature amount. The arithmetic device 100A derives the fundamental frequency corresponding to the rotational speed of the internal combustion engine 10 by the fundamental frequency derivation unit 104, and calculates a radio frequency based on the rotational speed of the internal combustion engine 10 by the radio frequency calculation unit 105. Then, the flow rate amplitude calculation unit 107 extracts a radio frequency of a plurality of frequencies equal to or higher than the fundamental frequency from the pulsation waveform based on the output value of the flow rate sensor 21s as a flow rate radio frequency, and calculates an amplitude of the flow rate radio frequency for each frequency. Further, the pressure amplitude calculation unit 112 extracts a radio frequency of a plurality of frequencies equal to or higher than the fundamental frequency from the pulsation waveform based on the output value of the pressure sensor such as the supercharging pressure sensor 23a as a pressure radio frequency, and calculates an amplitude of the pressure radio frequency for each frequency.

In subsequent Step S206, the arithmetic device 100A calculates the pulsation correction amount. In the arithmetic device 100A, for example, the correction amount derivation unit 108 derives the correction amount δ based on the flow velocity information μ corresponding to the average value in one cycle of the internal combustion engine 10 and pressure information, the amplitudes σ1, σ2, σ3, σ4, . . . , σn of the flow rate radio frequency for each frequency and the amplitude of the pressure radio frequency for each frequency, and the valve opening degree. The correction amount derivation unit 108, the correction amount derivation unit 108 can derive the correction amount δ by, for example, the above-mentioned correction map M, the multidimensional correction maps M0, M1, M2, M3, . . . , Mn, or the neural network model.

In subsequent Step S207, the arithmetic device 100A determines whether or not to perform pulsation correction for the output value of the flow rate sensor 21s. The arithmetic device 100A determines whether or not it is the transition period TP by, for example, the flow rate calculation unit 109. As described above, the transition period TP is a period from when the opening degree of the throttle valve 22c provided in the intake flow path 20 is increased until the output value of the supercharging pressure sensor 23a, which is a pressure sensor that measures the pressure of the throttle valve 22c downstream of the throttle valve 22c, reaches the output value corresponding to the atmospheric pressure.

When the flow rate calculation unit 109 determines that it is not the transition period TP, the pulsation correction for the output value of the flow rate sensor 21s is determined to be performed (YES), and the processing proceeds to Step S208. Further, when the flow rate calculation unit 109 determines that it is the transition period TP, the pulsation correction for the output value of the flow rate sensor 21s is determined not to be performed (NO), and the flow rate of air is calculated using only the output value of the flow rate sensor 21s. In this manner, it is possible to prevent unnecessary correction from being performed in the transition period TP in which no pulsation occurs in the flow rate of the air flowing through the intake flow path 20.

In Step 208, the arithmetic device 100A corrects the pulsation of the flow rate based on the output value of the flow rate sensor 21s. In the arithmetic device 100A, for example, the flow rate calculation unit 109 uses the pre-correction flow rate based on the output value of the flow rate sensor 21s output from the pre-correction flow rate calculation unit 106 and the correction amount δ output from the correction amount derivation unit 108 to calculate a flow rate of air flowing through the intake flow path 20 at the position of the flow rate sensor 21s. The flow rate of air calculated by the flow rate calculation unit 109 is input to, for example, an in-cylinder air amount estimation unit that estimates an air amount in the cylinder.

Similar to the first embodiment described above, the present embodiment can provide the internal combustion engine control device that includes the arithmetic device 100A capable of further reducing an error between a corrected air flow rate and an actual air flow rate as compared to the conventional device by more appropriately correcting the output value of the flow rate sensor 21s that measures a flow rate of air flowing through the intake flow path 20 of the internal combustion engine 10. Furthermore, the arithmetic device 100A can always ensure the accuracy of the flow rate sensor 21s by taking into account the information of the pressure sensor even under the operation conditions where an error is likely to occur in the flow rate sensor 21s due to pulsation, improve the accuracy of the air-fuel ratio control, and prevent the deterioration of exhaust gas.

Third Embodiment

Figure 17:
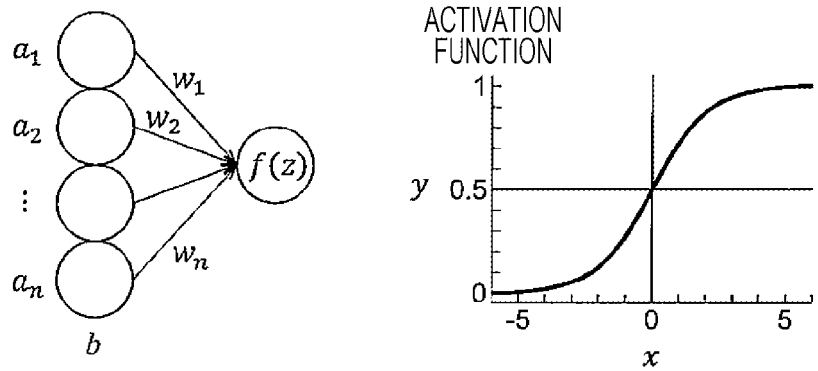
FIG. 17 is an explanatory diagram of a neural network model of the correction amount derivation unit shown in FIG. 13.
Figure 17:
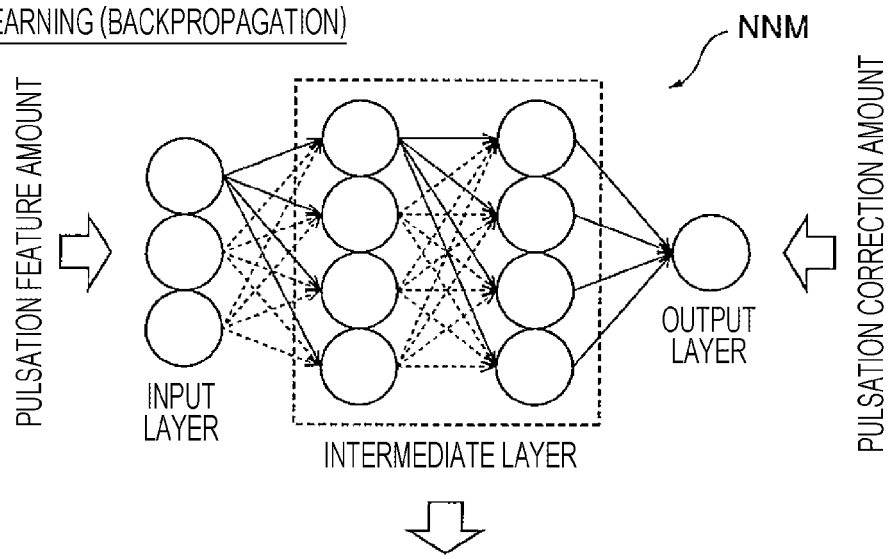
Figure 17:
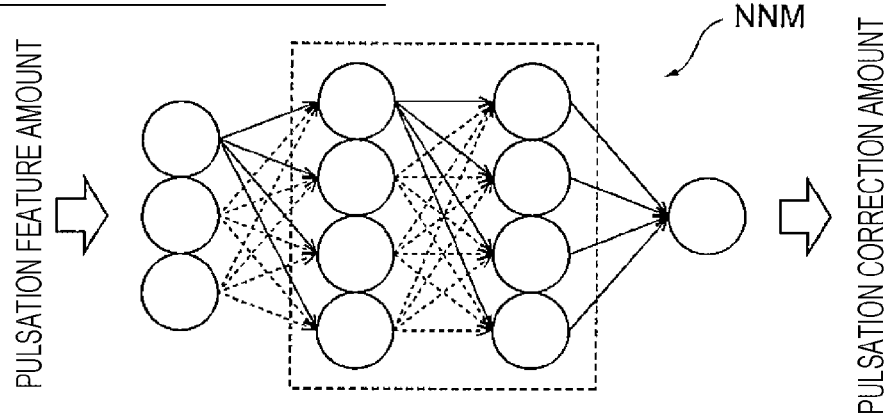

Next, the internal combustion engine control device according to a third embodiment of the present disclosure will be described with reference to FIGS. 17 and 18 by applying FIG. 1, FIGS. 3 to 9D, and FIGS. 12A to 15B. FIG. 17 is an explanatory diagram of a case where the correction amount derivation unit 108 includes a neural network model NNM.

The internal combustion engine control device of the present embodiment includes an arithmetic device, and the correction amount derivation unit 108 of the arithmetic device includes the neural network model NNM in place of the correction map M or the multidimensional correction maps M0, M1, M2, and M3 shown in FIGS. 10A and 10B. With respect to this point, the arithmetic device is different from the arithmetic device 100A of the internal combustion engine control device according to the second embodiment described above. The other configurations of the arithmetic device of the present embodiment, which are similar to those of the arithmetic device 100A according to the second embodiment described above, are given the same reference numerals and will be omitted from the description.

The correction amount derivation unit 108 derives a pulsation correction amount, which is the correction amount δ, based on the amplitude of the flow rate radio frequency for each frequency output from the flow rate amplitude calculation unit 107. The correction amount derivation unit 108 can include, for example, the neural network model NNM. The neural network model NNM is a mathematical model that imitates the mechanism of a brain neural circuit of a human being, and a weight and a bias are set for each neuron that constitutes the model. Further, a function called the activation function is defined for a neuron. A logistic function, a ramp function, or the like is appropriately set as the activation function. One layer is formed by a plurality of neurons, and an intermediate layer is set between an input layer and an output layer.

By increasing the number of neurons and the number of the intermediate layers, a more complex input/output relationship can be approximated. There is a trade-off relationship between the approximation accuracy and the model scale, and a trade-off point that satisfies requirements of both is selected. The input/output relationship can be approximated by setting the pulsation amplitude ratio for each pulsation frequency to the input layer, setting the matching result of the pulsation correction amount to the output layer, and machine learning (supervised) the weight and bias of each neuron. Backpropagation can be applied to an algorithm of the machine learning.

As described above, in the arithmetic device of the present embodiment, the correction amount derivation unit 108 includes the neural network model NNM. Then, in the neural network model NNM, the pulsation feature amount based on the amplitude of the flow rate radio frequency for each frequency is set to each unit of the input layer, the weight, bias, and activation function are set to each unit of the intermediate layer, and the pulsation correction amount is set as a correction amount to each unit of the output layer.

Hereinafter, a control method of the internal combustion engine 10 by the internal combustion engine control device of the present embodiment will be described.

Figure 18:
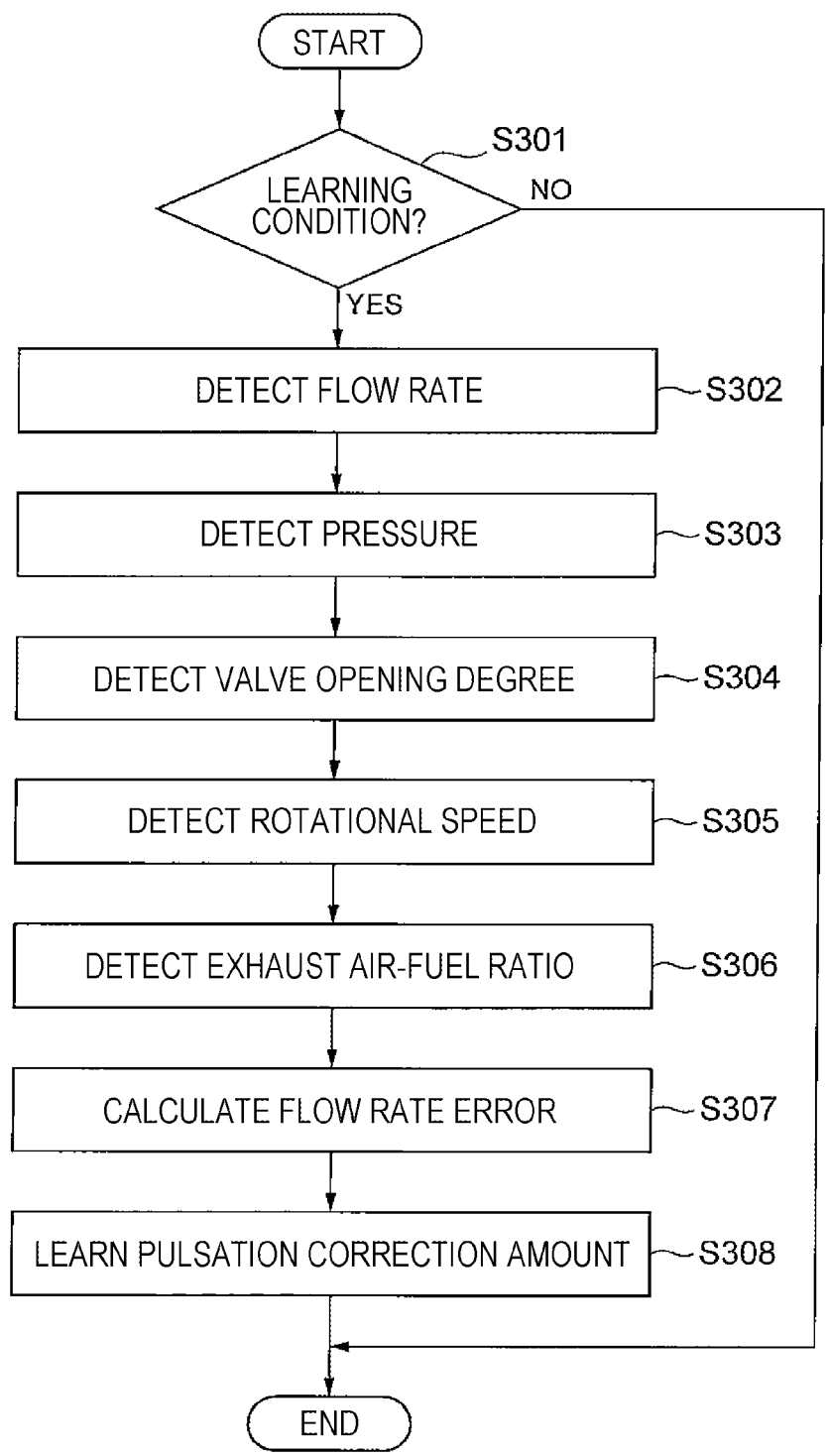
FIG. 18 is a flow chart of the control method for an internal combustion engine using the internal combustion engine control device according to a third embodiment.

FIG. 18 is a flow chart showing each step of the control method of the internal combustion engine 10 using the internal combustion engine control device of the present embodiment. In Step S301, the arithmetic device of the internal combustion engine control device determines whether or not to perform on-board learning of the pulsation correction amount. Ina case where, for example, it is determined not to be in the operation regions DR1 and DR2 shown in FIGS. 4 and 5 or it is determined to be the transition period TP shown in FIG. 14, the arithmetic device determines not to perform on-board learning (NO) and the control ends. On the other hand, in a case where, for example, it is determined to be in the operation regions DR1 and DR2 shown in FIGS. 4 and 5 or it is determined not to be the transition period TP shown in FIG. 14, the arithmetic device determines to perform on-board learning (YES) and the processing proceeds to Step S302.

In Steps S302 to S305, the arithmetic device performs processing similar to that in Steps S201 to 204 by the arithmetic device 100A according to the second embodiment shown in FIG. 16. The arithmetic device sets the data acquired in Steps S302 to S305 to the input layer of the neural network model NNM of the correction amount derivation unit 108. In subsequent Step S306, the arithmetic device detects an exhaust air-fuel ratio by, for example, the air-fuel ratio sensor 32a.

In subsequent Step S307, the arithmetic device calculates a true amount of air sucked into the cylinder from the fuel injection amount by the fuel injection valve 13 and the exhaust air-fuel ratio by, for example, a second flow rate calculation unit. That is, the second flow rate calculation unit uses the output value of the air-fuel ratio sensor 32a provided in the exhaust flow path 30 of the internal combustion engine 10 to calculate a flow amount of air which is a true amount of air flowing through the intake flow path 20 at the position of the flow rate sensor 21s. Furthermore, the arithmetic device calculates a flow rate error, which is a measurement error by the flow rate sensor 21s, based on the calculated true air amount and the intake air amount of the cylinder calculated using the output value of the flow rate sensor 21s.

In subsequent Step S308, the arithmetic device sets the calculated flow rate error to the output layer of the neural network model NNM of the correction amount derivation unit 108, and learns the weight and bias set to each neuron of the neural network model NNM by the backpropagation.

As described above, the arithmetic device of the internal combustion engine control device of the present embodiment includes, for example, the second flow rate calculation unit that calculates the flow rate of air flowing through the intake flow path 20 without using the output value of the flow rate sensor 21s. Further, in the arithmetic device of the present embodiment, the correction amount derivation unit 108 calculates the correction amount δ based on, for example, the flow rate calculated by the flow rate calculation unit 109 and the flow rate calculated by the second flow rate calculation unit. The correction amount δ is set to each unit of the output layer of the neural network model NNM, and the weight and bias set to each unit of the intermediate layer are updated.

As described above, the arithmetic device includes a function to perform on-board learning of the correction amount δ, so that the accuracy of the flow rate sensor 21s can always be ensured even under an operation condition where an error of the flow rate sensor 21s is likely to occur due to pulsation, the accuracy of air-fuel ratio control can be improved, and deterioration of exhaust gas can be prevented. Note that the second flow rate calculation unit of the arithmetic device may calculate the flow rate, which is the true air amount, by using, for example, the output value of a pressure sensor such as the supercharging pressure sensor 23a provided in the intake flow path 20.

Figure 19:
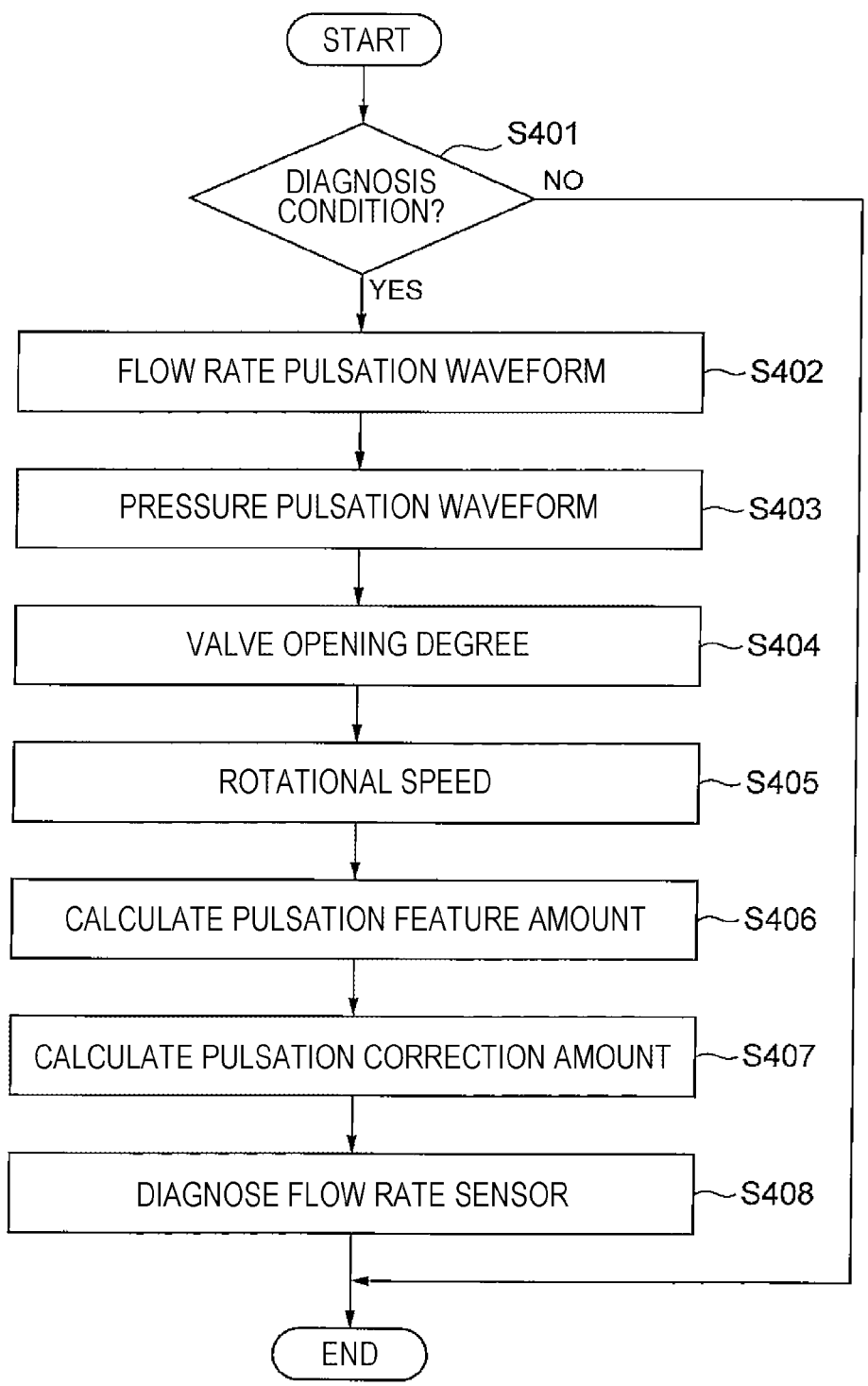
FIG. 19 is a flow chart of the control method for an internal combustion engine using the internal combustion engine control device according to the third embodiment.

FIG. 19 is a flow chart showing each step of the control method of the internal combustion engine 10 using the internal combustion engine control device of the present embodiment. In this example, the arithmetic device of the internal combustion engine control device includes an abnormality diagnosis unit, and uses a pulsation correction logic to diagnose an abnormality of the flow rate sensor 21s.

In Step S401, the arithmetic device determines whether or not a diagnostic condition is satisfied. If the diagnostic condition is satisfied (YES), the arithmetic device proceeds to Step S402, and if the diagnostic condition is not satisfied (NO), the arithmetic device ends the control. In Step S402, the arithmetic device acquires a flow rate pulsation waveform corresponding to the diagnostic condition by, for example, the A/D conversion unit 101 and the voltage/flow rate conversion unit 102.

In subsequent Step S403, the arithmetic device acquires a pressure pulsation waveform corresponding to the diagnostic condition by, for example, the A/D conversion unit 110 and the voltage/pressure conversion unit 111. In subsequent Step S404, the arithmetic device acquires a valve opening degree corresponding to the diagnostic condition by, for example, the A/D conversion unit 113 and the valve opening degree calculation unit 114. In subsequent Step S405, the arithmetic device acquires a rotational speed of the internal combustion engine corresponding to the diagnostic condition by, for example, the rotational speed calculation unit 103.

In subsequent Step S406, the radio frequency calculation unit 105, the flow rate amplitude calculation unit 107, the pressure amplitude calculation unit 112, and the correction amount derivation unit 108 calculate pulsation feature amounts of a flow rate and pressure. In subsequent Step S407, the data acquired in Steps S402 to S406 is set to the input layer of the neural network model NNM of the correction amount derivation unit 108, and a pulsation correction amount is calculated. In subsequent Step S408, the arithmetic device performs an abnormality diagnosis of the flow rate sensor 21s based on the absolute value of the correction amount δ, which is the pulsation correction amount, and a preset threshold value by the abnormality diagnosis unit.

As described above, the arithmetic device of the internal combustion engine control device of the present embodiment includes the abnormality diagnosis unit that diagnoses an abnormality of the flow rate sensor 21s based on the correction amount δ derived by the correction amount derivation unit 108. In this manner, for example, in a case where the absolute value of the correction amount δ is larger than the threshold value, the flow rate sensor 21s can be diagnosed as being abnormal. Since the pulsation correction amount of the flow rate sensor 21s changes depending on the pulsation state and the driving operation point, the diagnostic accuracy can be improved by setting the threshold value for each pulsation condition.

Although the embodiment of the internal combustion engine control device according to the present disclosure has been described in detail with reference to the drawings, the specific configuration is not limited to this embodiment, and a design change and the like within a range not deviating from the gist of the present disclosure are included in the present disclosure.

REFERENCE SIGNS LIST

10 internal combustion engine
20 intake flow path
21s flow rate sensor
22c throttle valve (valve)
23a supercharging pressure sensor (pressure sensor)
30 exhaust flow path
32a air-fuel ratio sensor
52 EGR valve (valve)
54 differential pressure sensor (pressure sensor)
60 internal combustion engine control device
100 arithmetic device
100A arithmetic device
104 fundamental frequency derivation unit
107 flow rate amplitude calculation unit
108 correction amount derivation unit
109 flow rate calculation unit
112 pressure amplitude calculation unit
NNM neural network model
TP transition period
δ correction amount
σ1 amplitude
σ2 amplitude
σ3 amplitude
σ4 amplitude

The invention claimed is:

1. An internal combustion engine control device for an internal combustion engine, the internal combustion engine control device comprising an arithmetic device to which an output value of a flow rate sensor that measures a flow rate of air flowing through an intake flow path is input,
wherein the arithmetic device includes at least one processor configured to:
derive a fundamental frequency that is a frequency of a pulsation waveform of the flow rate of air according to a rotational speed of the internal combustion engine;
extract one or more radio frequencies of a plurality of frequencies equal to or higher than the fundamental frequency from the pulsation waveform based on the output value of the flow rate sensor as a flow rate radio frequency;
calculate an amplitude of the flow rate radio frequency for each extracted frequency;
derive a correction amount based on the amplitude of the flow rate radio frequency for each extracted frequency;
calculate the flow rate of the air using the output value of the flow rate sensor and the correction amount; and,
cause a cylinder of the internal combustion engine to be controlled based on the calculated flow rate of the air using the output value of the flow rate sensor and the correction amount,
wherein
the at least one processor includes a neural network model, in which: an amplitude of the flow rate radio frequency for each extracted frequency is set to each unit of an input layer; a weight, a bias, and an activation function are set to each unit of an intermediate layer; and the correction amount is set to each unit of an output layer.

2. The internal combustion engine control device according to claim 1, wherein
the at least one processor is further configured to:
calculate the flow rate of the air by using only the output value of the flow rate sensor in a transition period from when an opening degree of a throttle valve provided in the intake flow path increases until an output value of a pressure sensor that measures a pressure of the intake flow path downstream of the throttle valve reaches the output value corresponding to atmospheric pressure.

3. The internal combustion engine control device according to claim 1, wherein
the at least one processor is further configured to:
calculate another flow rate of air flowing through the intake flow path without using the output value of the flow rate sensor, and
calculate another correction amount based on another flow rate of air calculated;
set the another correction amount to each unit of the output layer of the neural network model, and
update the weight and the bias.

4. The internal combustion engine control device according to claim 3, wherein the at least one processor is further configured to:
calculate the another flow rate of air by using an output value of a pressure sensor provided in the intake flow path.

5. The internal combustion engine control device according to claim 3, wherein the at least one processor is further configured to:

calculate the another flow rate of air by using an output value of an air-fuel ratio sensor provided in an exhaust flow path of the internal combustion engine.

6. The internal combustion engine control device according to claim 1, wherein the at least one processor is further configured to:
diagnose an abnormality of the flow rate sensor based on the correction amount.

7. An internal combustion engine control device for an internal combustion engine, the internal combustion engine control device comprising an arithmetic device to which an output value of a flow rate sensor that measures a flow rate of air flowing through an intake flow path is input,
wherein the arithmetic device includes at least one processor configured to:
derive a fundamental frequency that is a frequency of a pulsation waveform of the flow rate of air according to a rotational speed of the internal combustion engine;
extract one or more radio frequencies of a plurality of frequencies equal to or higher than the fundamental frequency from the pulsation waveform based on the output value of the flow rate sensor as a flow rate radio frequency;
calculate an amplitude of the flow rate radio frequency for each extracted frequency;
derive a correction amount based on the amplitude of the flow rate radio frequency for each extracted frequency;
calculate the flow rate of the air using the output value of the flow rate sensor and the correction amount; and,
cause a cylinder of the internal combustion engine to be controlled based on the calculated flow rate of the air using the output value of the flow rate sensor and the correction amount,
wherein
the at least one processor is configured to:
extract the at least one radio frequency of the plurality of frequencies equal to or higher than the fundamental frequency from the pulsation waveform based on an output value of a pressure sensor that measures a pressure of air flowing through the intake flow path as a pressure radio frequency;
calculate an amplitude of the pressure radio frequency for each extracted frequency, and
derive the correction amount based on the amplitude of the flow rate radio frequency for each extracted frequency, the amplitude of the pressure radio frequency for each extracted frequency, and an opening degree of a valve that controls the flow rate of air flowing through the intake flow path between the flow rate sensor and the pressure sensor.

* * * * *